US008419840B2

(12) United States Patent
Ishida et al.

(10) Patent No.: US 8,419,840 B2
(45) Date of Patent: Apr. 16, 2013

(54) AIR-CONDITIONING SYSTEM

(75) Inventors: Junya Ishida, Saitama (JP); Katsunori Iwase, Kariya (JP); Manabu Maeda, Nagoya (JP); Mamoru Hagiwara, Annaka (JP)

(73) Assignees: Shin-Etsu Polymer Co,. Ltd., Tokyo (JP); Denso Corporation, Aichi (JP); Shin-Etsu Chemical Co., Ltd., Tokyo (JP)

( * ) Notice: Subject to any disclaimer, the term of this patent is extended or adjusted under 35 U.S.C. 154(b) by 347 days.

(21) Appl. No.: 12/824,990

(22) Filed: Jun. 28, 2010

(65) Prior Publication Data

US 2010/0326121 A1 Dec. 30, 2010

(30) Foreign Application Priority Data

Jun. 30, 2009 (JP) ................ P2009-155535

(51) Int. Cl.
 *B01D 53/22* (2006.01)
 *B01D 71/06* (2006.01)
 *B01D 71/70* (2006.01)
 *F25D 17/04* (2006.01)

(52) U.S. Cl.
 USPC ............. 96/14; 96/4; 96/12; 96/13; 95/45; 95/54; 62/259.1; 62/407

(58) Field of Classification Search ........ 96/4, 11, 96/12, 13, 14; 95/45, 54; 62/259.1, 407
 See application file for complete search history.

(56) References Cited

U.S. PATENT DOCUMENTS

| | | | | |
|---|---|---|---|---|
| 4,216,303 | A | * | 8/1980 | Novicky ................ 528/32 |
| 2005/0284294 | A1 | * | 12/2005 | Lou et al. ............... 96/11 |
| 2007/0149699 | A1 | * | 6/2007 | Matsumoto et al. ..... 524/556 |
| 2007/0227358 | A1 | * | 10/2007 | Takigawa et al. ........ 96/11 |
| 2008/0011406 | A1 | * | 1/2008 | Arai ...................... 156/87 |
| 2009/0126567 | A1 | * | 5/2009 | Liu et al. ............... 95/45 |
| 2010/0294132 | A1 | * | 11/2010 | Ishida et al. ............ 96/11 |

FOREIGN PATENT DOCUMENTS

| | | |
|---|---|---|
| JP | 60-132605 A | 7/1985 |
| JP | 2-222715 A | 9/1990 |
| JP | 5-7749 A | 1/1993 |
| JP | 5-184891 | 7/1993 |
| JP | 6-188167 A | 7/1994 |
| JP | 9-285723 A | 11/1997 |

(Continued)

OTHER PUBLICATIONS esp@cenet patent abstract for Japanese Publication No. 5007749, Publication date Jan. 19, 1993 (1 page).

(Continued)

*Primary Examiner* — Jason M Greene
(74) *Attorney, Agent, or Firm* — Osha Liang LLP

(57) ABSTRACT

The present invention provides an air-conditioning system that supplies a gas to a space to be air-conditioned and/or discharges a gas from the space to be air-conditioned through a permeable membrane in order to provide an air-conditioning system that can sufficiently block suspended matter in the air such as SPM, and can sufficiently introduce outside air in which the permeable membrane is an asymmetric membrane formed of a polymeric material prepared by polymerizing a monomer composition containing a predetermined monomer.

7 Claims, 19 Drawing Sheets

FOREIGN PATENT DOCUMENTS

| | | |
|---|---|---|
| JP | 11-9976 | 1/1999 |
| JP | 11-192420 A | 7/1999 |
| JP | 2002-535115 A | 10/2002 |
| JP | 2004-203367 A | 7/2004 |
| JP | 2005-048060 A | 2/2005 |
| JP | 2006-305816 A | 11/2006 |
| JP | 2009-131833 A | 6/2009 |

OTHER PUBLICATIONS esp@cenet patent abstract for Japanese Publication No. 6188167, Publication date Jul. 8, 1994 (1 page).
esp@cenet patent abstract for Japanese Publication No. 5184891, Publication date Jul. 27, 1993 (1 page).
esp@cenet patent abstract for Japanese Publication No. 2002535115, Publication date Oct. 22, 2002 (1 page).
esp@cenet patent abstract for Japanese Publication No. 9285723, Publication date Nov. 4, 1997 (1 page).
esp@cenet patent abstract for Japanese Publication No. 60132605, Publication date Jul. 15, 1985 (1 page).
esp@cenet patent abstract for Japanese Publication No. 2222715, Publication date Sep. 5, 1990 (1 page).
esp@cenet patent abstract for Japanese Publication No. 11192420, Publication date Jul. 21, 1999 (1 page).
esp@cenet patent abstract for Japanese Publication No. 11009976, Publication date Jan. 19, 1999 (1 page).
esp@cenet patent abstract for Japanese Publication No. 2004203367, Publication date Jul. 22, 2004 (1 page).
Office Action for Japanese Application No. 2009-155535 dated Jan. 22, 2013 (2 pages).
Patent Abstract for Japanese Publication No. 2009-131833 published Jun. 18, 2009 (1 page).
Patent Abstract for Japanese Publication No. 2005-048060 published Feb. 24, 2005 (1 page).
Patent Abstract for Japanese Publication No. 2006-305816 published Nov. 9, 2006 (1 page).

\* cited by examiner

AIR-CONDITIONING SYSTEM

BACKGROUND OF THE INVENTION

1. Field of the Invention

The present invention relates to an air-conditioning system.

2. Related Background Art

Asymmetric membranes formed of various polymeric materials have been conventionally known. Examples of such asymmetric membranes include membranes using fluorine-containing polyimides as coating materials (Patent Documents 1 and 2), a membrane using a polyacrylonitrile (Patent Document 3), a membrane using a polyolefin (Patent Document 4), a membrane using a polyethersulfone (Patent Document 5), membranes using poly(1-trimethylsilyl-1-propyne) (PTMSP) (Patent Documents 6 and 7), and membranes manufactured by sol-gel method. All of these membranes are intended for gas separation or liquid-liquid separation, and their gas permeability is not sufficient.

The recent technological advances have made it possible to increase air-tightness even in spaces such as automobiles, where increasing the air-tightness has been difficult. When many passengers are aboard an automobile with such high air-tightness for long hours, a decrease in oxygen concentration or an increase in carbon dioxide concentration will occur, which may cause the passengers a headache or an unpleasant feel. Thus, the introduction of an adequate amount of outside air is necessary.

However, urban roads, highways, and the like are contaminated with pollutants such as dust; therefore, direct introduction of outside air into automobiles has been a big problem in view of the passengers' health. One example of a method for solving this problem is a method in which an inlet for introducing outside air is provided with a filter for removing pollutants in the air such as suspended matter.

Non-woven cloths, mechanical filters, and the like have been conventionally used as such filters. In Patent Document 10, an air-conditioning system for the entire automobile is suggested.

Patent Document 1: JP 05-7749 A
Patent Document 2: JP 06-188167 A
Patent Document 3: JP 05-184891 A
Patent Document 4: JP 2002-535115 A
Patent Document 5: JP 09-285723 A
Patent Document 6: JP60-132605 A
Patent Document 7: JP 02-222715 A
Patent Document 8: JP 11-192420 A
Patent Document 9: JP 11-9976 A
Patent Document 10: JP 2004-203367 A

PROBLEMS TO BE SOLVED BY THE INVENTION

However, conventional filters such as non-woven cloths and mechanical filters had a problem in that they cannot sufficiently remove suspended matter in the air having particle sizes of 10 μm or less (hereinafter referred to as "SPM"). Among SPM, particularly nanoparticles having particle sizes on the order of 10 nanometers, when inhaled into a human body, are considered to reach the lower respiratory tract such as the bronchium and alveo, and be easily deposited. Thus, there is a strong desire for the development of an air-conditioning system that can sufficiently block these nanoparticles.

The use of a gas-permeation membrane made of a polymeric material as a filter enables removal of SPM to some extent; in this case, however, the gas permeability is insufficient, and the object of introducing sufficient outside air cannot be achieved.

The present invention was made in view of the above-described circumstances. An object of the present invention is to provide an air-conditioning system that can remove suspended matter in the air such as SPM, and can sufficiently introduce outside air.

SUMMARY OF THE INVENTION

The present invention provides an air-conditioning system that supplies a gas to a space to be air-conditioned and/or discharges a gas from the space to be air-conditioned through a permeable membrane in which the permeable membrane is an asymmetric membrane made of a polymeric material prepared by polymerizing a monomer composition containing a monomer represented by Formula (1):

wherein each $R^1$ is independently a $C_{1-12}$ alkyl group and/or a $C_{6-10}$ aryl group, X is a group represented by Formula (i) and/or a group represented by Formula (ii):

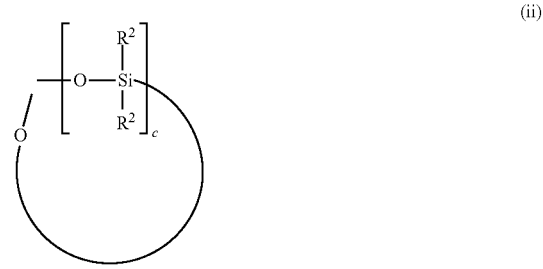

wherein each $R^2$ is independently a $C_{1-12}$ alkyl group, d is an integer of 1 to 5, and c is an integer of 3 to 5; a is an integer of 1 to 3, and b is an integer of 0 to 2.

According to such an air-conditioning system, it is possible to sufficiently block suspended matter in the air such as SPM, and to sufficiently introduce outside air. The asymmetric membrane refers to a membrane having a porous layer and a dense layer adjacent thereto. Preferably, the surface of the dense layer has pores of a nanometer size or a micrometer size in the asymmetric membrane.

The polymeric material is preferably an addition polymer prepared by addition polymerization of a monomer composition containing the monomer represented by Formula (1). Thereby, a more remarkable effect according to the present invention can be attained.

The polymeric material is preferably a polymeric material in which silica is dispersed. This improves gas permeability of the asymmetric membrane.

Preferably, the ratio between an oxygen permeability coefficient $P(O_2)$ and a carbon dioxide permeability coefficient $P(CO_2)$ of the asymmetric membrane at 23±2° C. and under no pressure difference across the membrane satisfies the expression (3) given below. Thereby, a particularly remarkable effect according to the present invention can be attained.

$$1.0 < P(O_2)/P(CO_2) < 1.70 \tag{3}$$

The air-conditioning system according to the present invention can be particularly suitably applied to vehicles (automobiles) and houses.

According to the present invention, an air-conditioning system that can sufficiently block suspended matter in the air such as SPM and can sufficiently introduce outside air can be provided.

DESCRIPTION OF THE PREFERRED EMBODIMENTS

Preferred embodiments of the present invention are described in detail below; however, the invention is not limited to the following embodiments.

(Asymmetric Membrane)

Figure 1:
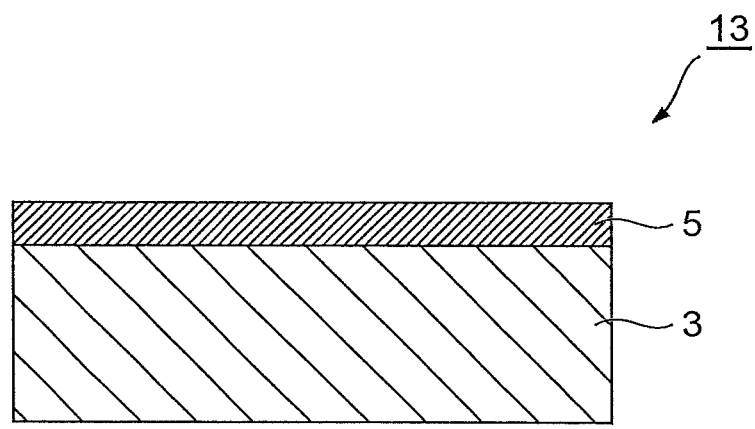
FIG. 1 is a sectional view showing one embodiment of an asymmetric membrane.

FIG. 1 is a cross-sectional view showing one embodiment of the asymmetric membrane. The asymmetric membrane 13 shown in FIG. 1 includes a porous layer 3 and a dense layer 5 adjacent to the porous layer 3. The dense layer 5 is a layer that may be generally referred to as the "skin layer" in this technical field. The porous layer 3 and dense layer 5 are integrally formed of the same polymeric material. The dense layer 5 has a nanometer size or a micrometer size pores (for example 20 to 80 nanometer).

Fillers may be dispersed in the asymmetric membrane 13. The asymmetric membrane 13 may contain only the polymeric material that forms an asymmetric structure having the porous layer 3 and dense layer 5, or the polymeric material and fillers as major components, but may further contain other components.

The asymmetric membrane 13 preferably has a thickness of 0.1 to 10 mm.

The dense layer 5 has the function of selectively permeating gases such as nitrogen and oxygen while preventing the permeation of SPM. For this purpose, the dense layer 5 may have a density such that it can sufficiently prevent the permeation of SPM. Specifically, a nanometer size or a micrometer size pores are formed on the surface of the dense layer 5. The dense layer 5, however, may contain pores having a pore volume smaller than that of the porous layer 3, as an open cell or half-open cell.

In order to ensure sufficient gas permeability, the thickness of the dense layer 5 is preferably 1 μm or less. The thickness of the dense layer 5 is preferably 0.005 μm or more, and more preferably 0.01 μm or more.

The porous layer 3 functions as a support for the dense layer 5 while maintaining a high degree of gas permeability. If the dense layer 5 is used alone, reducing the thickness of the dense layer 5 for ensuring sufficient gas permeability may result in insufficient strength and the like in the entire membrane. However, because the porous layer 3 functions as a support for supporting the dense layer 5, sufficient mechanical strength and ease of handling are maintained in the asymmetric membrane 13 as a whole. From this standpoint and the like, the thickness of the porous layer 3 is preferably 1 to 500 mm.

To achieve the object of the present invention at a particularly high level, the asymmetric membrane 13 is preferably a membrane whose permeation rate of a gas depends on the molecular weight of the gas. In other words, it is preferred that Knudsen flow is predominant in the flows of gases within the asymmetric membrane 13. The "Knudsen flow" means the flow of a gas so thin that the molecular movement becomes problematic (see Kagaku Daijiten 3 ("Dictionary of Chemistry, Vol. 3"), edited by Kagaku Daijiten Henshu Iinkai ("Edition Committee of Dictionary of Chemistry"); reduced-size edition, p. 44). When Knudsen flow is predominant, the permeation rate of a gas depends on the reciprocal number of the square root of the molecular weight of the gas.

In a membrane through which a gas permeates by ideal Knudsen flow, the permeability coefficient P of a gas is inversely proportional to the square root of the molecular weight of the gas. When the gas components permeated are oxygen and carbon dioxide, the separation ratio α between them is 1.17, as expressed by Formula (4) given below. In Formula (4), $P(O_2)$ and $P(CO_2)$ represent the permeability coefficients of oxygen and carbon dioxide, respectively; and $M(O_2)$ and $M(CO_2)$ represent the molecular weights of oxygen and carbon dioxide, respectively.

$$\alpha = \frac{P(O_2)}{P(CO_2)} = \frac{\sqrt{M(CO_2)}}{\sqrt{M(O_2)}} = 1.17 \quad (4)$$

There is also a gas flow referred to as "solution-diffusion flow". The solution-diffusion flow is a flow that depends on the product of the solubility of a gas in the membrane and the diffusion coefficient of the gas in the membrane. The permeation rate of a gas in the membrane by the solution-diffusion flow is generally slower than that by Knudsen flow. In conventional polymeric membranes, the solution-diffusion flow is often predominant in the flows of gases permeating through the membranes. It is known that, in membranes in which the solution-diffusion flow is predominant, the separation ratio α between oxygen and carbon dioxide is 1 or less (around 0.3 to 0.7, depends on polymer) because the permeation rate of carbon dioxide is generally bigger than that of oxygen.

As described above, it is possible to evaluate the condition of the flow of a gas permeating through a membrane based on the value of the separation ratio α. Although mixtures of the various types of flow are considered to be occurring in actual membranes, Knudsen flow can be assumed to be predominant when the separation ratio α $(=P(O_2)/P(CO_2))$ is within a range that satisfies Formula (3) given below. The oxygen permeability coefficient $P(O_2)$ and carbon dioxide permeability coefficient $P(CO_2)$ are measured at 23±2° C. and under substantially no pressure (total pressure) difference through the membrane.

$$1.0 < P(O_2)/P(CO_2) < 1.70 \quad (3)$$

Although the reason that Knudsen flow occurs in the asymmetric membrane 13 is not necessarily clear, the present inventors believe the reason to be as explained below.

It is believed that gas permeability coefficients for the entire asymmetric membrane 13 depend on the permeability of the dense layer 5, and little affected by the porous layer 3. Furthermore, it is believed that Knudsen flow is occurring in the pores formed on the surface of the dense layer 5 and/or the space of the inner side of dense layer 5. In the present case, it is presumed that the distance that the gas permeates by Knudsen flow is longer than the distance that the gas permeates by the solution-diffusion flow, and Knudsen flow becomes predominant in the membrane as a whole, leading to dramatically improved gas permeability. Moreover, SPM is blocked at the portion where the gas permeates by the solution-diffusion flow, enabling the removal of suspended matter in the air such as SPM.

When fillers are dispersed in asymmetric membrane 13 as mentioned above, Knudsen flow is occurring not only on the surface of the dense layer 5 and/or the space of the inner side of dense layer 5, but also in the clearance formed in boundaries between fillers and polymer, leading to further improvement of gas permeability of the asymmetric membrane 13.

(A Polymeric Material)
(I) Monomer Composition

The polymeric material is obtained by polymerizing a monomer composition containing a monomer represented by Formula (1):

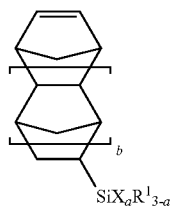

(1)

In Formula (1), $R^1$ is a $C_{1-12}$ alkyl group and/or a $C_{6-10}$ aryl group. Examples of the $C_{1-12}$ alkyl group include a methyl group, an ethyl group, an n-propyl group, a butyl group, and a pentyl group, and a methyl group is preferable. Examples of the $C_{6-10}$ aryl group include a phenyl group and a naphthyl group, and a phenyl group is preferable.

The symbol a is an integer of 1 to 3, and 3 is preferable. The symbol b is an integer of 0 to 2, while 0 or 1 is preferable, and 0 is most preferable.

The symbol X is a chain polysiloxane residue represented by Formula (i) or a cyclic polysiloxane residue represented by Formula (ii):

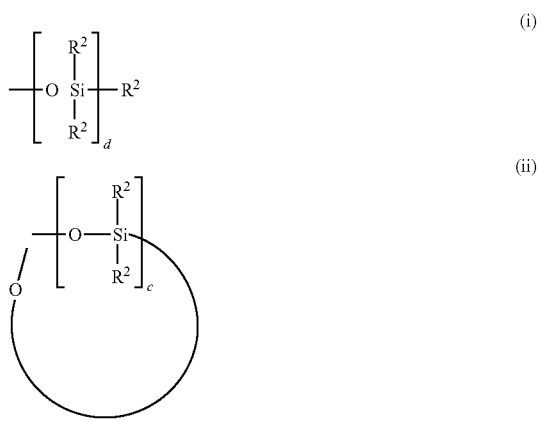

wherein each $R^2$ is independently a $C_{1-12}$ alkyl group. More specific examples thereof include the groups mentioned about $R^1$ above, and a methyl group is preferable. The symbol d is an integer of 1 to 5, and the symbol c is an integer of 3 to 5.

Examples of the monomer represented by Formula (1) include the followings. In the formula, Me designates a methyl group.

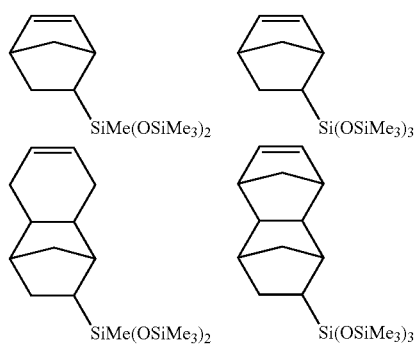

-continued

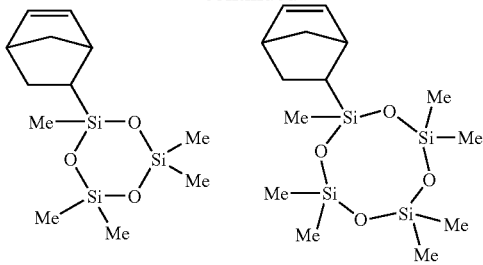

The monomer represented by Formula (1) can be prepared by the Diels-Alder reaction of a vinyl group-containing compound represented by Formula (5) or (6) with cyclopentadiene:

$$(CH_2=CH)SiX_aR^1{}_{3-a} \quad (5)$$

wherein $R^1$, X, and a are as mentioned above;

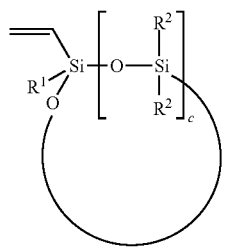

(6)

wherein $R^1$, $R^2$, and c are as mentioned above.

In the monomer designated by Formula (1), examples of the vinyl group-containing compound used to prepare the monomer having the group represented by Formula (i) as X can include tristrimethylsiloxyvinylsilane, and examples of the vinyl group-containing compound used to prepare the monomer having the group represented by Formula (ii) as X can include a vinyl group-containing compound represented by Formula (6).

The monomer composition may contain cyclic olefins represented by Formula (4):

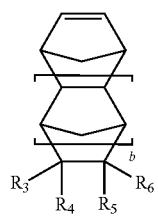

(4)

In Formula (4), $R^3$ to $R^6$ are each independently a hydrogen atom, a halogen atom, a group selected from an alkyl group, an alkenyl group, a cycloalkyl group, an aryl group, an alkoxy group, an aryloxy group, and a halogenated hydrocarbon group each having 1 to 10 carbon atoms; a polar group selected from an oxetanyl group, an alkoxycarbonyl group, and a polyoxyalkylene group; or a group selected from an alkoxysilyl group. $R^3$ and $R^4$, or $R^3$ and $R^6$ may form, together with a carbon atom to which they are attached, an aliphatic ring structure, an aromatic ring structure, a carbon imide group, or an acid anhydride group. The symbol b is an integer of 0 to 2. Preferably, $R^3$ is a hydrogen atom.

Examples of the aliphatic ring structure include those having 4 to 10 carbon atoms. These structures are shown as follows, for example. In the following examples, Me designates a methyl group and Ph designates a phenyl group.

Alicyclic Structure

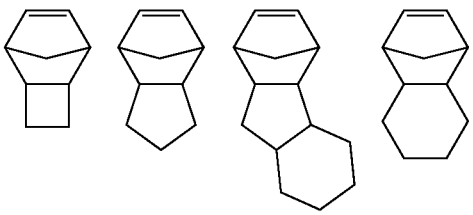

Carbonimide Group

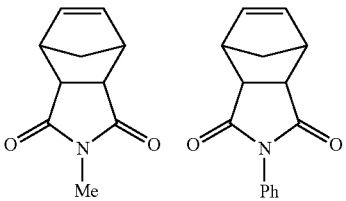

(II) Addition Polymer

The addition polymer contains a repeating unit represented by Formula (7) derived from the monomer represented by Formula (1). In the case where a size of micropores in the asymmetric membrane is controlled, use of the addition polymer is preferable to that of a ring-opening polymer described later because an asymmetric membrane having finer pores is obtained.

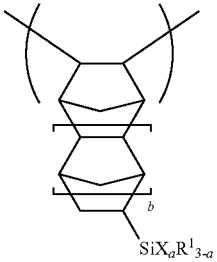

(7)

wherein $R^1$, X, a, and b are as mentioned above. With respect to the repeating unit (7) in the addition polymer, $R^1$, X, a, and b each may be the same or different from each other.

The addition polymer may be a copolymer containing a repeating unit represented by Formula (8) derived from the monomer represented by Formula (4) in addition to the repeating unit represented by Formula (7). The repeating units (7) and (8) are random-bonded to each other.

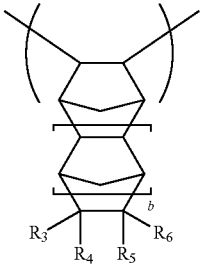

(8)

wherein $R^3$ to $R^6$ and b are as mentioned above, and for the repeating unit (8) in the addition polymer, $R^3$ to $R^6$ and b each may be the same or different from each other.

A proportion of the repeating unit of Formula (8) is preferably from 5% to 50% of the number of all of the repeating units, and more preferably from 10 to 30%. At a proportion of less than the lower limit, only a polymer having a low molecular weight is likely to be obtained, leading to reduction of a coating ability. At a proportion exceeding the upper limit, the effect attributed to X in Formula (1) is likely to deteriorate.

The polymer has a number average weight molecular weight of preferably 10,000 to 2,000,000 and more preferably 300,000 to 1,000,000 in terms of polystyrene conversion determined by GPC. A polymer having a molecular weight exceeding the upper limit is practically difficult to be synthesized. On the other hand, strength of the membrane is likely to deteriorate at a molecular weight of less than the lower limit.

According to an official method, addition polymerization is performed, namely, the monomer composition is dissolved in an aromatic hydrocarbon solvent such as toluene and xylenes, and the obtained mixture is polymerized by stirring the mixture in an inert gas atmosphere at a temperature of 20 to 40° C. under normal pressure in the presence of a polymerization catalyst and a promoter. Examples of the polymerization catalyst can include metallocene complexes having a central metal selected from the elements of Group 8, Group 9, and Group 10 of the periodic table, e.g., iron (Fe), cobalt (Co), nickel (Ni), ruthenium (Ru), rhodium (Rh), palladium (Pd), and platinum (Pt), and preferably can include metallocene catalysts of nickel (Ni) and those of palladium (Pd). Organoaluminium compounds can be used as the promoter, and methyl aluminoxane is preferable.

An amount of the catalyst and that of the promoter to be used are within the following ranges, respectively. The amount of the catalyst is preferably from 0.01 to 100 millimole atoms based on a total of 1 mol of the monomers represented by the formulas (1) and (2). An amount of the promoter is preferably from 0.5 to 10,000 mol based on 1 mol of the catalysts.

A molecular weight regulator may be added into the polymerization system when necessary. Examples of the molecular weight regulator include hydrogen; α-olefins such as ethylene, butene, and hexene; aromatic vinyl compounds such as styrene, 3-methylstyrene, and divinylbenzene; unsaturated ethers such as ethyl vinyl ether; and vinyl silicon compounds such as tris(trimethylmethoxy)vinylsilane, divinyldihydrosilane, and vinylcyclotetrasiloxane.

The ratio of the solvent to the monomer, the polymerizing temperature, polymerizing time, and the amount of the molecular weight regulator significantly receive influences by the catalyst to be used and the structure of the monomer, for example. Accordingly, values of these are difficult to be generally limited. It is necessary to properly use these according to a purpose to obtain a polymer having the above-mentioned specific structure.

The molecular weight of the polymer is regulated according to the amount of the polymerization catalyst, the amount of the molecular weight regulator to be added, a conversion rate from the monomer to the polymer, or the polymerizing temperature.

The polymerization is stopped by a compound selected from water, alcohols, ketones, organic acids, and etc. A catalyst residue can be separated and removed from a polymer solution by adding a mixture of water and alcohol with acids such as lactic acid, malic acid, and oxalic acid to the polymer solution. Removal by absorption using activated carbon, diatomaceous earth, alumina, silica, and the like, and removal by filtration separation by a filter can be used to remove the catalyst residue.

The polymer can be obtained by placing the polymerization solution in an alcohol such as methanol and ethanol or a ketone such as acetone and methyl ethyl ketone, solidifying the polymerization solution, and drying the polymerization solution usually for 6 to 48 hours at 60° C. to 150° C. under reduced pressure. At this step, the catalyst residue and the unreacted monomer that remain in the polymer solution are also removed. The unreacted monomer containing siloxane can be easily removed by using a solvent obtained by mixing cyclic polysiloxanes such as octamethylcyclotetrasiloxane and decamethylcyclopentasiloxane with the alcohols or ketones.

(III) Ring-Opening Polymer

The ring-opening polymer contains a repeating unit represented by Formula (9) derived from the monomer represented by Formula (1):

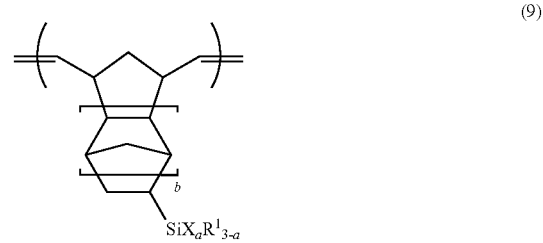

(9)

wherein $R^1$, X, a, and b are as mentioned above; in the repeating unit (9) of the ring-opening polymer, $R^1$, X, a, and b each may be the same or different from each other.

The ring-opening polymer may be a copolymer containing a repeating unit represented by Formula (10) derived from the monomer represented by Formula (4) in addition to the repeating unit (9). The repeating units (9) and (10) are random-bonded to each other.

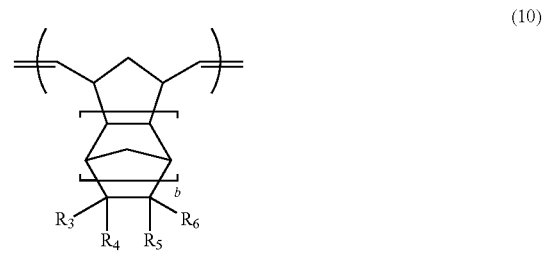

(10)

wherein $R^3$ to $R^6$ and b are as mentioned above; in the repeating unit (10) of the ring-opening polymer, $R^3$ to $R^6$ and b each may be the same or different from each other.

A proportion of the repeating unit of Formula (10) is preferably from 5% to 50% of the number of the total repeating units, and more preferably from 10 to 30%. At a proportion of less than the lower limit, only a polymer having a low molecular weight is likely to be obtained, leading to reduction of a coating ability. At a proportion exceeding the upper limit, the effect attributed to X in Formula (1) is likely to deteriorate.

In the polymer or the copolymer (hereinafter, abbreviated as the "polymer."), at least part of carbon-carbon double bonds of the principal chain may be hydrogenated. Hydrogenation improves thermal stability of the polymer. A hydrogenation ratio can be calculated, for example, by comparing a peak intensity after hydrogenation to a peak intensity derived from the carbon-carbon double bonds of the principal chain in the $^1$H-NMR spectrum of polycycloolefin before hydrogenation. The proportion of the hydrogenated carbon-carbon double bonds of the principal chain is preferably from 50 to 100%, more preferably not less than 80%, and most preferably not less than 90%.

The polymer has a number average weight molecular weight of preferably 10,000 to 2,000,000, and more preferably 300,000 to 1,000,000 in terms of polystyrene conversion determined by GPC. A polymer having a molecular weight exceeding the upper limit is practically difficult to be synthesized. On the other hand, strength of the membranous is likely to deteriorate at a molecular weight of less than the lower limit.

Ring opening methathesis is performed according to an official method, namely, the monomer composition is dissolved in an aromatic hydrocarbon solvent such as toluene and xylenes, and the mixture is polymerized by stirring the mixture in a nitrogen atmosphere at a temperature of 40 to 60° C. under normal pressure in the presence of a polymerization catalyst. As the polymerization catalyst, the so-called a carbene type complex such as a tungsten complex, a molybdenum complex, and a ruthenium complex can be used. Preferably, a first generation Grubbs catalyst, a second generation Grubbs catalyst, or a Hoveyda-Grubbs catalyst is used. Polymerization can be performed by using the catalyst in a concentration of 1 to 1000 ppm and preferably 5 to 500 ppm based on the monomer as a raw material. At a concentration of less than 5 ppm, a polymerization rate is slow, leading to inferior practicality. A concentration of more than 500 ppm may not be economically preferable.

A hydrogenation reaction of the obtained polymer can be performed, for example, by using a hydrogen gas in the presence of a hydrogenation catalyst and converting the principal chain carbon-carbon double bonds of silicone-modified polycycloolefin into saturated single bonds.

The hydrogenation catalyst to be used is not limited in particular, and homogeneous catalysts and heterogeneous catalysts, i.e., those generally used to hydrogenate olefin compounds can be used properly.

Examples of the homogeneous catalyst include dichlorotris(triphenylphosphine)rhodium known as a Wilkinson complex; the ruthenium carbene complex catalyst described in the metathesis polymerization catalyst; and transition metal complex catalysts made of a ruthenium compound, which are described in Japanese Unexamined Patent Application Publication No. 07-2929, Japanese Unexamined Patent Application Publication No. 11-109460, Japanese Unexamined Patent Application Publication No. 11-158256, and Japanese Unexamined Patent Application Publication No. 11-193323.

Examples of the heterogeneous catalyst include hydrogenation catalysts obtained by carrying a metal such as nickel, palladium, platinum, rhodium, and ruthenium onto a support such as carbon, silica, celite, alumina, and titanium oxide. More specifically, nickel-alumina and palladium-carbon can be used, for example. These hydrogenation catalysts can be used alone or in combination.

Of these, noble metal complex catalysts such as rhodium and ruthenium and palladium carried catalysts such as palladium-carbon are preferably used because the carbon-carbon double bonds in the principal chain of the polymer can be hydrogenated selectively without causing a side reaction of a functional group or the like. A ruthenium carbene complex catalyst is particularly preferable.

The ruthenium carbene complex catalyst can be used as both of the ring opening metathesis reaction catalyst and the hydrogenation catalyst. In this case, the ring opening metathesis reaction and the hydrogenation reaction can be performed continuously. In the case where the ring opening metathesis reaction and the hydrogenation reaction are continuously performed using the ruthenium carbene complex catalyst, a method for adding a catalyst modifier such as a vinyl compound (ethyl vinyl ether and etc) or $\alpha$-olefins, activating the catalyst, and then, starting the hydrogenation reaction is also preferably used.

The hydrogenation reaction is preferably performed in an organic solvent. The organic solvent can be properly selected according to solubility of a hydride to be produced, and the same organic solvent as the polymerization solvent above can be used. Accordingly, the reaction can be performed by using a reaction solution as it is or by additionally adding the hydrogenation catalyst to the reaction solution, without replacing the solvent after the polymerization reaction.

Conditions of the hydrogenation reaction may be properly selected according to a kind of the hydrogenation catalyst to be used. An amount of the hydrogenation catalyst to be used is usually from 0.01 to 50 parts by weight based on 100 parts by weight of the ring-opening polymer, and preferably from 0.05 to 10 parts by weight. A reaction temperature is from 100° C. to 200° C. A temperature not less than that easily causes a side reaction. A reaction pressure of hydrogen is usually from 0.01 to 10.0 MPa, and preferably from 0.1 to 5.0 MPa. At the hydrogen pressure of not more than 0.01 MPa, a hydrogenation reaction rate reduces. At the hydrogen pressure of not less than 5.0 MPa, a high pressure resistant apparatus is needed.

The hydrogenation reaction thus performed can hydrogenate not less than 50% of the principal chain carbon-carbon double bonds, preferably not less than 80% thereof, and most preferably not less than 90% thereof.

(iv) Filler

Preferably, fillers are dispersed in the polymeric material from a viewpoint of improvement of gas permeability.

As the filler, an organic filler or an inorganic filler can be used. The filler may have a hydrophilic surface or may have a hydrophobic surface. An inorganic filler having a hydrophilic surface is particularly preferable. Examples of such an inorganic filler include oxide based fillers made of oxides such as silica, zeolite, alumina, titanium oxide, magnesium oxide, and zinc oxide. Of these, silica based fillers are preferable. Examples of the silica based fillers include spherical silica, porous silica particles, quartz powder, glass powder, glass bead, talc, and silica nanotubes.

In order to particularly increase gas permeability, the filler is preferably a porous filler. As the porous filler, mesoporous silica particles, nano porous silica particles, and zeolite particles are preferable. The mesoporous silica particles are porous silica particles having a particle size of 500 to 1000 nm in which pores are formed. The nano porous silica particles are porous silica particles having a particle size of 30 to 100 nm in which pores are formed. Usually, the mesoporous silica particles have a pore size of 3 to 7 nm, and the nano porous silica particles have a pore size of 2 to 5 nm. It is considered that use of the filler having a low apparent density like the porous filler significantly improves performance of the asymmetric membrane.

A filler subjected to surface treatment using a coupling agent or the like or hydrophilization by hydration treatment may be used when necessary.

A content of the filler is typically from 5 to 500 parts by mass based on 100 parts by mass of the polymeric material. The content of the filler is more preferably not less than 11 parts by mass, still more preferably not less than 30 parts by mass, and particularly preferably from 70 parts by mass to 400 parts by mass. A content of the filler less than 5 parts by mass tends to reduce the effect of improving gas permeability. A content of the filler more than 500 parts by mass tends to reduce mechanical strength of the asymmetric membrane so that formation of a thin film is difficult.

(V) Method for Producing Asymmetric Membrane

The asymmetric membrane can be obtained by a method comprising a step of applying the above-mentioned polymeric material onto a base material to form a solution layer; a step of partially removing a solvent from the solution layer to form a dense layer containing the polymeric material on a surface layer opposite to the base material of the solution layer; and a step of immersing the solution layer having the dense layer formed into a poor solvent (solidifying solvent) of the polymeric material to form a porous layer containing the polymeric material, for example.

As a solvent that dissolves the polymeric material, aromatic hydrocarbons, aliphatic hydrocarbons, halogenated hydrocarbons, ethers, or ketones are preferably used. Examples of aromatic hydrocarbons include benzene, toluene, and xylenes. Examples of aliphatic hydrocarbons include hexane, heptane, octane, decane, and cyclohexane. Examples of halogenated hydrocarbons include chloroform, methylene chloride, and carbon tetrachloride. Examples of ethers include tetrahydrofuran and dioxane. Examples of ketones include ethyl methyl ketone.

Upon preparation of the polymer solution, film formation is often performed by adding other substance in order to urge phase separation or to adjust solubility of the polymer, and viscosity of the polymer solution. As such a film-forming regulator, a compound having a compatibility of not less than 0.1% based on the polymer solution can be used. As the regulator, salts soluble in the polymer solution, water, lower alcohols (methanol and ethanol), and amide based polar solvents (dimethylformamide and dimethylacetamide) can be used, for example.

Upon formation of the dense layer, conditions on removal of the solvent (e.g., a drying method, a temperature, and a time) are properly regulated so as to form the dense layer having a desired thickness.

As the poor solvent (solidifying solvent) used in order to form the porous layer, alcohols such as methanol, ethanol, and propanol, acetone, or water is preferably used.

The asymmetric membrane will not be limited to the embodiments described above, and modifications will be properly made without deviating from the spirit of the present invention. For example, the asymmetric membrane may further include a mesh. In this case, the mesh may be impregnated into at least one of the porous layer and the dense layer. Alternatively, the mesh may be laminated on the porous layer or the dense layer. The asymmetric membrane having the mesh can be produced by impregnating the mesh into the mixed solution above or applying the mixed solution onto the mesh, for example.

The mesh can improve gas permeability, and can improve mechanical strength of the membrane to prevent breakage of the membrane caused by an external force. The mesh may be made of a metal or made of a resin, and that made of a resin is particularly preferable. Examples of the resin used to form the mesh include polyester terephthalate (PET) and polypropylene (PP). Examples of methods for weaving the mesh include plain weave, twill weave, plain dutch weave, and twill dutch weave.

The surface of the mesh is preferably treated using an adhesion promoter (primer) in order to improve strength of the asymmetric membrane. Commercially available adhesion promoters can be used for the adhesion promoter.

The asymmetric membrane may be formed on a support, or may be a hollow fiber membrane.

(Air-Conditioning System)

The asymmetric membrane according to the above-described embodiments is suitably used as a permeable membrane in an air-conditioning method in which a gas is supplied to a space to be air-conditioned and/or the gas is discharged from the space to be air-conditioned via the permeable membrane. The air-conditioning system according to the present embodiment includes a membrane that supplies a gas to a space to be air-conditioned and/or discharges the gas from the space to be air-conditioned; and a partition wall that forms the space to be air-conditioned, while forming an opening in which the permeable membrane is provided. The partition wall is made of one or more members formed to block the permeation of gases.

The permeable membrane is installed at, for example, an inlet for introducing outside air. The space to be air-conditioned is a space that requires exchanging the gases inside the space with outside air. Specific examples of the space to be air-conditioned include interior spaces of vehicles (automobiles), houses, the Shinkansen (bullet trains) and aircraft.

(Air-Conditioning System for Houses)

Figure 2:
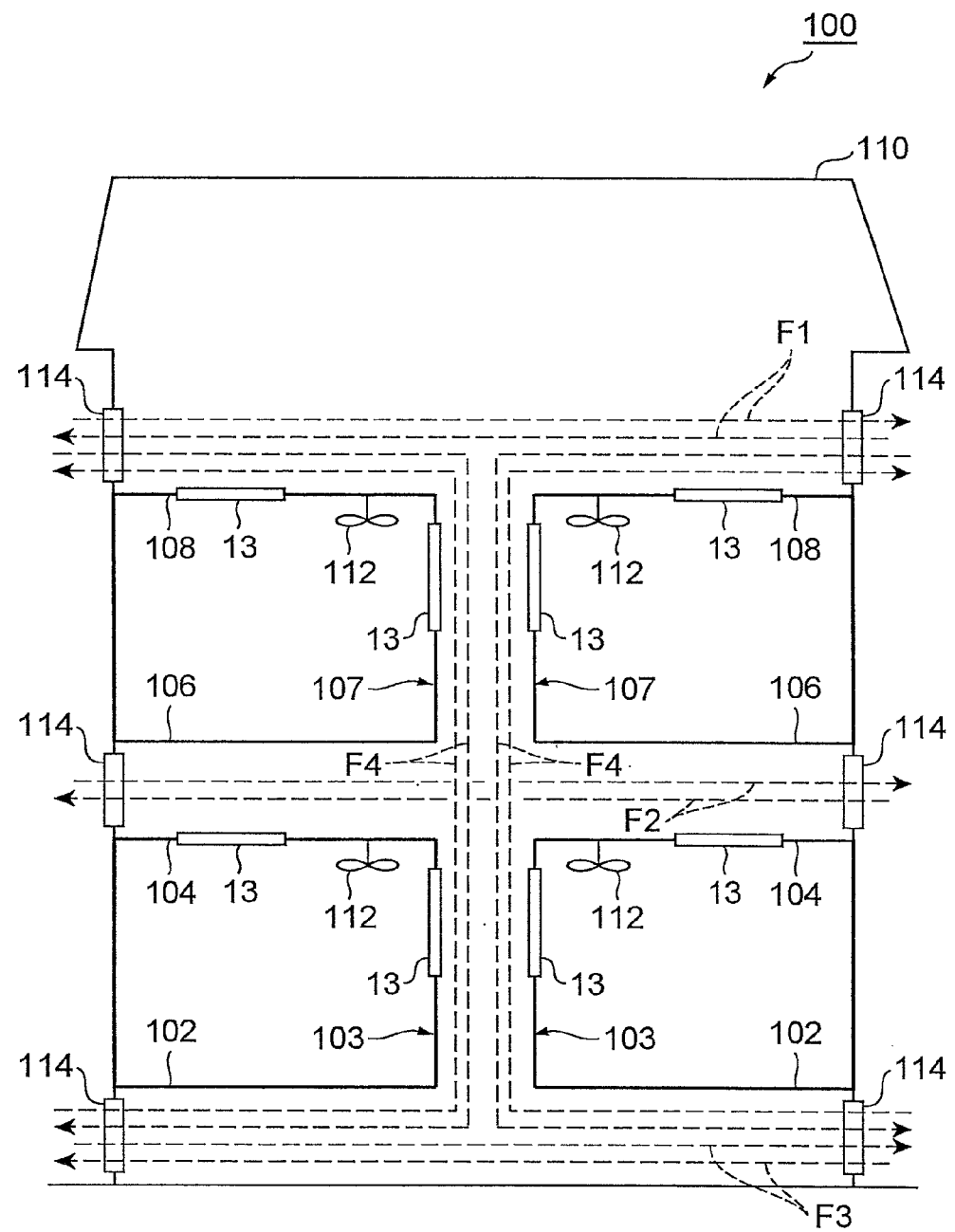
FIG. 2 is a drawing showing one embodiment of an air-conditioning system for houses according to the present invention.

Next, an air-conditioning system for houses, which is a suitable embodiment of an air-conditioning system according to the present invention, will be described. FIG. 2 is a schematic sectional view of an air-conditioning system 100 for houses in a two-storied house 110 cut in a height direction of a house 110.

The air-conditioning system 100 for houses includes a permeable membrane 13 made of the above-mentioned asymmetric membrane on a side wall 103 and a ceiling 104 of the interior of the house 110 on the first floor (space to be air-conditioned) and a side wall 107 and a ceiling 108 of the interior thereof on the second floor (space to be air-conditioned). The air-conditioning system 100 for houses also includes a fan 112 in the interior of each floor. The air-conditioning system 100 for houses further includes a pair of vents 114 provided under the first floor 102, between the first floor ceiling 104 and the second floor 106, and above the second floor ceiling 108, each pair of the vents facing each other in a width direction of the house 110. The air-conditioning system 100 for houses includes a heater (a kerosene fan heater) (not shown) in the interior of each floor (inside of the space to be air-conditioned).

The interior of each floor is substantially shut off from the outside air in parts other than the permeable membrane 13. Namely, the inside air of each floor contacts the outside air taken in from the vent 114 into the house 110 only through the permeable membrane 13. Between the respective pairs of the vents 114, air currents F1, F2, F3, and F4 are formed. These air currents supply the outside air to the interior, and discharge the air discharged from the interior to the outdoor.

When the kerosene fan heater is operated in the interior of each floor, an $O_2$ concentration in the interior reduces and a $CO_2$ concentration increases with combustion of kerosene. In the interior of each floor, there exits CO generated by incomplete combustion of kerosene and VOC diffused from building materials or interior materials that configure the house 110. Accordingly, inside air has a lower concentration of $O_2$ and higher concentrations of $CO_2$, CO and VOC than those of the outside air. Attributed to such a difference between the concentration of the inside air and that of the outside air, $O_2$ in the outside air is introduced through the permeable membrane 13 to the interior, and $CO_2$, CO, and VOC are discharged through the permeable membrane 13 to the outside. Such introduction of $O_2$ and discharge of $CO_2$, CO, and VOC (gas exchange) through the permeable membrane 13 are performed until each difference of the concentrations of $O_2$, $CO_2$, CO, and VOC between the inside air and the outside air is eliminated. As a result, the inside air and the outside air can have uniform concentrations of $CO_2$, CO, and VOC.

In the air-conditioning system 100 for houses, efficiency of the gas exchange can be improved by circulating the inside air with the fan 112. The gas exchange can be also accelerated by the air currents F1, F2, F3, and F4 that flow between the respective pairs of the vents 114.

In the air-conditioning system 100 for houses, among gases that exist in the interior, only a gas whose concentration is different from that in the outside air is selectively exchanged through the permeable membrane 13. Additionally, an amount of the gas that permeates through the membrane is limited to an amount needed to eliminate the difference of the gas concentration between both sides of the permeable membrane 13 so that the gas exceeding the amount does not permeate through the membrane. Namely, the air-conditioning system 100 for houses does not perform excessive ventilation. As a result, heat loss of the air-conditioning system 100 for houses caused by ventilation can be suppressed. For example, $CO_2$ and CO attributed to the kerosene fan heater and harmful gases (a deteriorated part of an inside air composition) produced in the interior such as VOC diffused from building materials or interior materials are estimated to be at most 3% of the entire inside air. Here, assuming that the total amount of the gases to be exchanged between the interior and the outside air is 3% of the entire inside air, heat loss is 3%, allowing suppressed heat loss compared with the conventional 24-hour ventilation system for houses. Also in the case where the air-conditioning system 100 for houses includes a refrigerated air conditioner in the interior (inside of the space to be air-conditioned) of each floor, heat loss of the air-conditioning system 100 for houses caused by ventilation can be suppressed.

Further, in the air-conditioning system 100 for houses, discharge and introduction of the gas are performed through the permeable membrane 13 made of the above-mentioned asymmetric membrane. For this reason, it is possible to prevent the suspended matter in the air such as SPM and nSPM from flowing into the interior.

An installation area of the permeable membrane 13 may be set to such an extent that $O_2$ having a largest amount of exchange needed between the interior and the outside air can be exchanged sufficiently, for example. For example, in the case where the space to be air-conditioned of the air-conditioning system 100 for houses has a size of 6 mats (10.94 $m^2$)×a ceiling height of 2.4 m, a volume of the space to be air-conditioned is 26.26 $m^3$. Assuming that an amount of consumption of $O_2$ by the kerosene fan heater is 1.2% per hour, the total amount of $O_2$ consumed per hour by the kerosene fan heater within the space to be air-conditioned is 26.26 $m^3$×1.2%/h=0.315 $m^3$/h. An amount of consumption of $O_2$ per person is approximately 0.0244 $m^3$/h. Then, an amount of consumption of $O_2$ per hour within the space to be air-conditioned when the kerosene fan heater is operated in the state that four persons exist within the space to be air-conditioned of 6 mats is 0.315 $m^3$/h+0.0244 $m^3$/h×4=0.4126 $m^3$/h. Here, assuming that a permeability of $O_2$ in the permeable membrane 13 is $0.5 \times 10^{-2}$ $cm^3/sec/cm^2$=0.18 $m^3/h/m^2$, an installation area of the permeable membrane 13 needed to permeate $O_2$ of an amount equivalent to the amount of consumption of $O_2$ per hour within the space to be air-conditioned is 0.4126 $m^3$/h÷0.18 $m^3/h/m^2$=2.29 $m^2$ (approximately 1.5 m×1.5 m). From a viewpoint of securing the area in which the permeable membrane 13 of this size can be installed, an installation location of the permeable membrane 13 is preferably a side wall or a ceiling of the interior (the space to be air-conditioned). $CO_2$ and VOC each having a concentration lower than that of $O_2$ in the interior can be exchanged sufficiently with the permeable membrane 13 having the above-mentioned area.

A thickness of the permeable membrane 13 is preferably from 0.1 to 10 μm.

Air-Conditioning System for Vehicles

A First Embodiment

Figure 3:
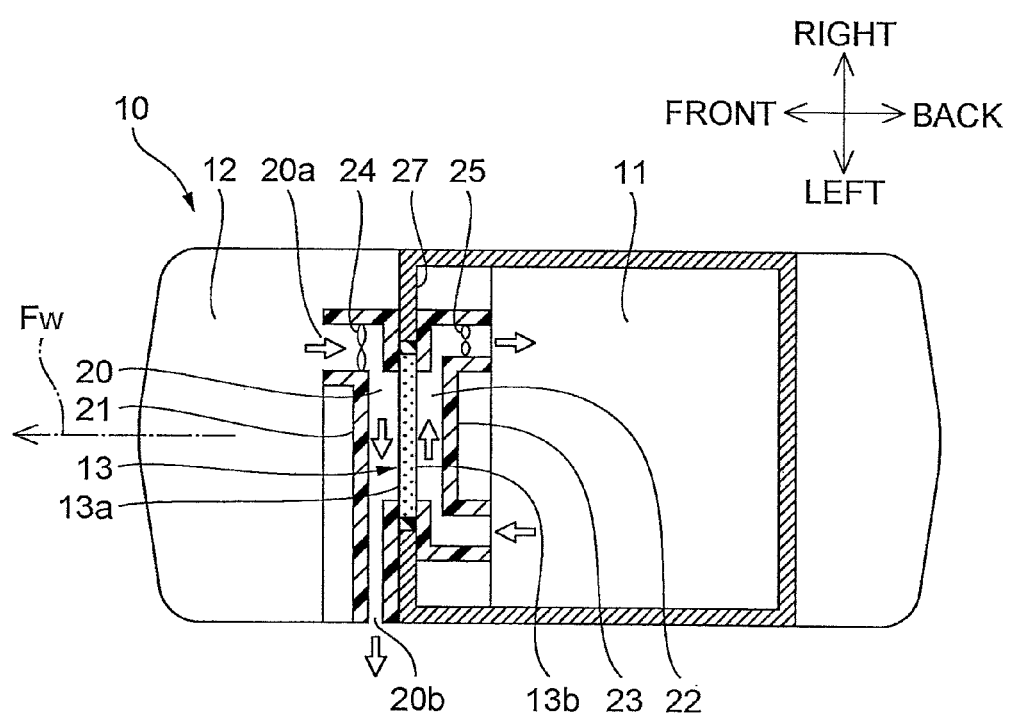
FIG. 3 is a drawing showing a first embodiment of an air-conditioning system for vehicles according to the present invention.

Next, an air-conditioning system for vehicles, which is a suitable embodiment of the air-conditioning system according to the present invention, will be described. FIG. 3 is a schematic sectional view of a vehicle on which an air-conditioning system for vehicles in a first embodiment is mounted. In FIG. 3, arrows of four directions designate respective directions of the vehicle, and an arrow Fw designates the forward direction of the vehicle.

In a front end part of a cabin 11 (an area surrounded and shown by the bold solid line in FIG. 3) where a passenger gets aboard, a partition (firewall) 27 that separates the cabin 11 from an engine room 12 is provided. Through holes penetrated from the cabin 11 side to the engine room 12 side are formed in a part of the partition 27, and the through holes are covered with the permeable membrane 13.

In the engine room 12, an outside-air duct 21 is disposed along the partition 27, the outside-air duct 21 forming an outside-air passage 20 through which the outside air flows. In the cabin 11, an inside-air duct 23 is disposed along the partition 27, the inside-air duct 23 forming an inside-air passage 22 through which the inside air flows.

Through holes are formed in a part of wall surfaces of the outside-air duct 21 and the inside-air duct 23. The outside-air duct 21 and the inside-air duct 23 are disposed with respect to the partition 27 so that the through holes may overlap the permeable membrane 13.

In other words, the permeable membrane 13 is disposed at a boundary between the outside-air passage 20 and the inside-air passage 22 so that one surface 13a of the permeable membrane 13 (the surface of the engine room 12 side) may be exposed to the outside-air passage 20 to contact the outside air, and the other surface 13b (the surface of the cabin 11 side) may be exposed to the inside-air passage 22 to contact the inside air.

In the outside-air passage 20, an outside-air blower 24 that produces a flow of the outside air and supplies the outside air to the one surface 13a of the permeable membrane 13 is disposed. In the inside-air passage 22, an inside-air blower 25 that produces a flow of the inside air and supplies the inside air to the other surface 13b of the permeable membrane 13 is disposed.

The outside-air blower 24 and the inside-air blower 25 are the one that has a compression ratio of less than two among fluid machinery that gives kinetic energy to a gas or increases pressure, and are specifically a fan, a blower, and the like.

In the outside-air duct 21, an outside-air inlet 20a that flows the outside air into the outside-air passage 20, and an outside-air outlet 20b that flows the outside air to the outside of the outside-air passage 20 are formed.

The outside-air inlet 20a and the outside-air outlet 20b are configured so that a pressure (total pressure) P1 in the outside-air inlet 20a, a pressure (total pressure) P2 in the outside-air outlet 20b, and a pressure Pv of the supplied air by the outside-air blower 24 may satisfy a pressure relationship given below.

Namely, the outside-air inlet 20a and the outside-air outlet 20b are configured so that a difference of the pressures (P2−

P1) obtained by subtracting the inlet pressure P1 from the outlet pressure P2 may be not more than the pressure Pv of the supplied air both when the vehicle stops and when the vehicle runs. In other words, the inlet pressure P1, the outlet pressure P2, and the pressure Pv of the supplied air satisfy the relationship of $P2-P1 \leq Pv$ both when the vehicle stops and when the vehicle runs.

In the example of FIG. 3, the outside-air inlet 20a is opened toward the front side of the vehicle, and the outside-air outlet 20b is opened toward the left side thereof. Thereby, the outside-air outlet 20b receives a traveling wind (dynamic pressure) when the vehicle runs less than the outside-air inlet 20a does. As a result, the above-mentioned pressure relationship is satisfied.

Operation of the outside-air blower 24 and the inside-air blower 25 is controlled by a control unit (ECU) for air-conditioning, which is not shown. The control unit for air-conditioning is formed of a known microcomputer including a CPU, a ROM, and a RAM and peripheral circuits thereof. The control unit for air-conditioning performs various arithmetic operations and processings on the basis of control programs stored in the ROM to control the operation of electric appliances such as the outside-air blower 24 and the inside-air blower 25.

Next, operation in the above-mentioned configuration will be described. When the control unit for air-conditioning operates the outside-air blower 24 and the inside-air blower 25, a flow of the outside air is produced in the outside-air passage 20, and a flow of the inside air is produced in the inside-air passage 22.

At this time, when a concentration of a certain component in the inside air in the inside-air passage 22 is lower than a concentration of the component in the outside air in the outside-air passage 20, the difference between the concentrations of the component causes the component in the outside air to permeate through the permeable membrane 13 to be mixed with the inside air. For this reason, the concentration of the component in the inside air increases.

Conversely, when a concentration of a certain component in the inside air in the inside-air passage 22 is higher than a concentration of the component in the outside air in the outside-air passage 20, the difference between the concentrations of the component causes a gas of the component in the inside air to permeate through the permeable membrane 13 to be mixed with the outside air. For this reason, the concentration of the component in the inside air reduces.

For example, when oxygen is consumed by breathing of the passenger within the cabin 11 so that the concentration of oxygen in the inside air reduces, oxygen in the outside air in the outside-air passage 20 permeates through the permeable membrane 13 and is mixed with the inside air in the inside-air passage 22. For this reason, the concentration of oxygen in the inside air increases.

Moreover, when carbon dioxide is produced by breathing of the passenger within the cabin 11 so that the concentration of carbon dioxide in the inside air increases, carbon dioxide in the inside air of the inside-air passage 22 permeates through the permeable membrane 13 and is mixed with the outside air of the outside-air passage 20 so that the concentration of carbon dioxide in the inside air reduces. For this reason, the concentration of oxygen and that of carbon dioxide within the cabin 11 can be kept at a concentration comfortable for the passenger. An odor gas such as body odors can be suppressed similarly.

On the other hand, liquids and solids in the outside air of the outside-air passage 20 never permeate through the permeable membrane 13 at all, or only slightly permeate therethrough. For this reason, the permeable membrane 13 can suppress invasion of these liquids and solids to the inside-air passage 22.

Further, in the conventional vehicles, when a temperature outside of the cabin is low, e.g., in the winter season, water vapors produced by breathing of the passenger within the cabin 11 increase humidity in the inside air to cause fogging of the window. Fogging of the window interferes with driving. For that reason, the outside air is introduced to prevent fogging, resulting in production of heat loss in heating due to ventilation. On the other hand, in the present embodiment, because the water vapors in the inside air of the inside-air passage 22 permeate through the permeable membrane 13 and are mixed with the outside air of the outside-air passage 20, humidity in the inside air can be reduced, preventing fogging the window. For this reason, necessity for introduction of the outside air reduces, and heat loss due to ventilation can be reduced, resulting in energy saving and miniaturization of the air-conditioner.

Moreover, in the present embodiment, because the outside-air blower 24 and the inside-air blower 25 are provided, fresh outside air and inside air can be supplied to the permeable membrane 13 without the outside air and the inside air stagnating in the vicinity of the permeable membrane 13.

Further, in the present embodiment, the inlet pressure P1, the outlet pressure P2, and the pressure Pv of the supplied air satisfy the relationship of $P2-P1 \leq Pv$ both when the vehicle stops and when the vehicle runs. For this reason, a flow direction of the outside air in the outside-air passage 20 can be a direction from the outside-air inlet 20a to the outside-air outlet 20b both when the vehicle stops and when the vehicle runs.

In other words, because the flow direction of the outside air in the outside-air passage 20 can be fixed both when the vehicle stops and when the vehicle runs, stagnation and backflow of the outside air in the outside-air passage 20 can be prevented, and as a result, the fresh outside air can be supplied to the permeable membrane 13.

As a result, because reduction in permeability of the permeable membrane 13 caused by stagnation of the outside air and inside air in the vicinity of the permeable membrane 13 can be prevented both when the vehicle stops and when the vehicle runs, the permeability of the permeable membrane 13 can be stably demonstrated.

When odors and harmful gases included in the exhaust gas discharged from the vehicle, odors around the engine, and the like flow into the outside-air passage 20 and stagnate for a long time, these odors and harmful gases permeate through the permeable membrane 13, and easily invade into the cabin 11. In the present embodiment, however, because the fresh outside air is supplied to the permeable membrane 13, invasion of these odors and harmful gases into the cabin 11 can be reduced.

In the example of FIG. 3, for the inlet pressure P1, the outlet pressure P2, and the pressure Pv of the supplied air to satisfy the relationship of $P2-P1 \leq Pv$ even when the vehicle runs, the outside-air inlet 20a of the outside-air passage 20 is directed to the front side of the vehicle and the outside-air outlet 20b of the outside-air passage 20 is directed to the left side of the vehicle. However, the configuration of the outside-air inlet 20a and the outside-air outlet 20b to satisfy the above-mentioned pressure relationship will not be limited to this.

For example, an inlet opening angle is defined as an angle that the forward direction Fw of the vehicle makes with an opening direction of the outside-air inlet 20a, and an outlet opening angle is defined as an angle that the forward direction Fw of the vehicle makes with an opening direction of the outside-air outlet 20b. Then, if the outside-air inlet 20a and the outside-air outlet 20b are configured in an arrangement relation in which the inlet opening angle is not more than the outlet opening angle, the inlet pressure P1 can be made higher than the outlet pressure P2 by a predetermined amount so that the above-mentioned pressure relationship can be satisfied.

Here, in the case where a plurality of the outside-air inlets 20a and a plurality of the outside-air outlets 20b are provided and those opening directions are different from each other, an average angle of the inlet opening angles and an average angle of the outlet opening angles may be compared.

The average angle is calculated as follows. Namely, for example, the average angle of the inlet opening angles is a value obtained by first determining a product of the opening angle and an opening area in each of the outside-air inlets 20a, adding the products, and subsequently dividing the product by the total opening area. The average angle of the outlet opening angles is calculated in the same way.

Moreover, as the configuration of the outside-air inlet 20a and the outside-air outlet 20b to satisfy the above-mentioned pressure relationship, for example, the outside-air inlet 20a and the outside-air outlet 20b may be configured to have the area relationship in which the opening area of the outside-air inlet 20a has an area not less than the opening area of the outside-air outlet 20b.

Such a configuration can make pressure loss in the outside-air inlet 20a smaller than that in the outside-air outlet 20b. For this reason, the inlet pressure P1 can be made higher than the outlet pressure P2 by a predetermined amount so that the above-mentioned pressure relationship can be satisfied.

The above-mentioned arrangement relationship and area relationship between the outside-air inlet 20a and the outside-air outlet 20b may be used in combination.

As apparent from the description above, in the present embodiment, permeability function by the permeable membrane 13 is realized without providing a large pressure difference between the outside-air side and inside-air side of the permeable membrane 13 by a pressure difference generator such as a vacuum pump.

Specifically, the air-conditioning system according to the present embodiment operates in the range of pressure fluctuation such that a pressure (ram pressure) produced by the traveling wind of the vehicle and a pressure of the blower 23 having a compression ratio of less than two are applied to a general atmospheric pressure. More specifically, the air-conditioning system according to the present embodiment operates in the range where the pressure difference between the outside-air side and inside-air side of the permeable membrane 13 is not more than 5 kPa.

A Second Embodiment

Figure 4:
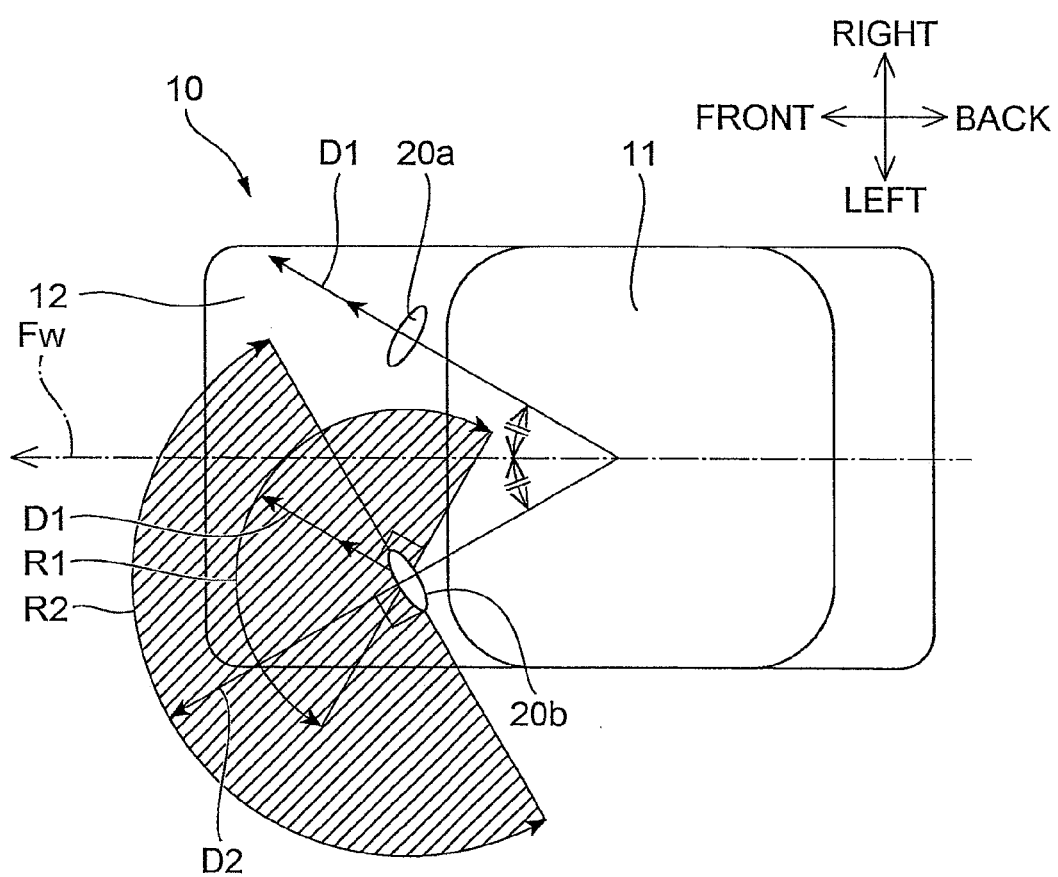
FIG. 4 is a drawing showing a second embodiment of an air-conditioning system for vehicles according to the present invention.

In a second embodiment shown in FIG. 4, a difference (P2−P1) of the outlet pressure P2 and the inlet pressure P1 when the vehicle runs is smaller than that of the first embodiment above. Specifically, a degree of the traveling wind received in the outside-air outlet 20b is brought closer to that received in the outside-air inlet 20a.

For example, the opening direction of the outside-air outlet 20b is set within a first range R1 or a second range R2 shown in FIG. 4. Thereby, the degree of the traveling wind received in the outside-air outlet 20b can be brought closer to that received in the outside-air inlet 20a.

Here, the first range R1 is a range of a direction where the direction makes an angle of not more than 90° with the opening direction D1 of the outside-air inlet 20a when the vehicle is observed from every side of the lateral side, the top side, and the front side thereof.

Moreover, the second range R2 is a range of a direction where the direction makes an angle of not more than 90° with a direction D2 symmetrical to the opening direction D1 of the outside-air inlet 20a when the vehicle is observed from every side of the lateral side, the top side, and the front side thereof. For easy understanding, FIG. 4 shows the first range R1 and the second range R2 when the vehicle is observed from the top side thereof.

In the first embodiment above, the difference (P2−P1) between the outlet pressure P2 and the inlet pressure P1 fluctuates to some extent by presence of the traveling wind. For this reason, the amount of the wind that flows into the outside-air passage 20 fluctuates to some extent between the time when the vehicle stops and the time when the vehicle runs, and as a result, gas permeability with the permeable membrane 13 also fluctuates to some extent between the time when the vehicle stops and the time when the vehicle runs.

In consideration of this point, in the present embodiment, the difference (P2−P1) between the outlet pressure P2 and the inlet pressure P1 when the vehicle runs is made smaller. For this reason, fluctuation of the difference (P2−P1) between the outlet pressure P2 and the inlet pressure P1 between the time when the vehicle stops and the time when the vehicle runs can be suppressed, and the gas permeability of the permeable membrane 13 can be more stably demonstrated.

A Third Embodiment

Figure 5:
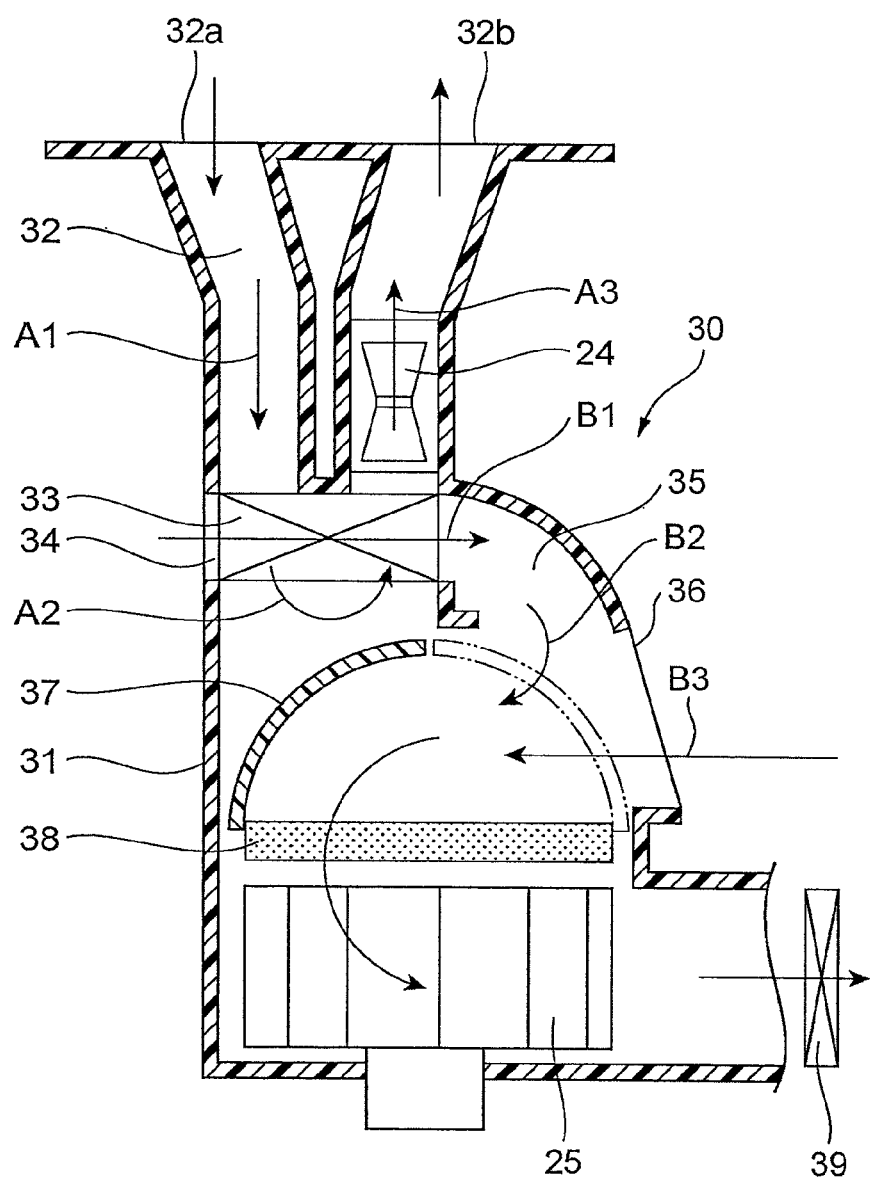
FIG. 5 is a drawing showing a third embodiment of an air-conditioning system for vehicles according to the present invention.

In a third embodiment, as shown in FIG. 5, a permeable membrane module 33 into which the permeable membrane 13 is incorporated is used, and the inside-air blower 25 serves also as a fan for air-conditioning of an air-conditioner 30 for vehicles.

An air-conditioning case 31 in the air-conditioner 30 for vehicles is disposed within a dashboard (not shown) disposed in the foremost part of the cabin 11. A passage through which the air flows is formed in the inside of the air-conditioning case 31.

The air-conditioning case 31 is molded of a resin having a certain degree of elasticity and high mechanical strength, e.g., polypropylene.

An approximately U-shaped outside-air passage 32 through which the outside air makes a U-turn and flows as shown by arrows A1 to A3, an outside-air inlet 32a that flows the outside air into the outside-air passage 32 and an outside-air outlet 32b that flow the outside air to the outside of the outside-air passage 32 are formed in a portion upstream of the air-conditioning case 31.

In the outside-air passage 32, the outside-air blower 24 is disposed in a portion downstream of a portion where the outside-air passage 32 bends in a U shape (on the outside-air outlet 32b side).

In the part where the outside-air passage 32 bends in a U shape in the outside-air passage 32, the permeable membrane module 33 into which a permeable membrane is incorporated is disposed. Within the air-conditioning case 31, the inside-air blower 25 (the fan for air-conditioning) is disposed on the side opposite to the outside-air inlet 32a and the outside-air outlet 32b (on the lower side of FIG. 5) with respect to the permeable membrane module 33.

Figure 6:
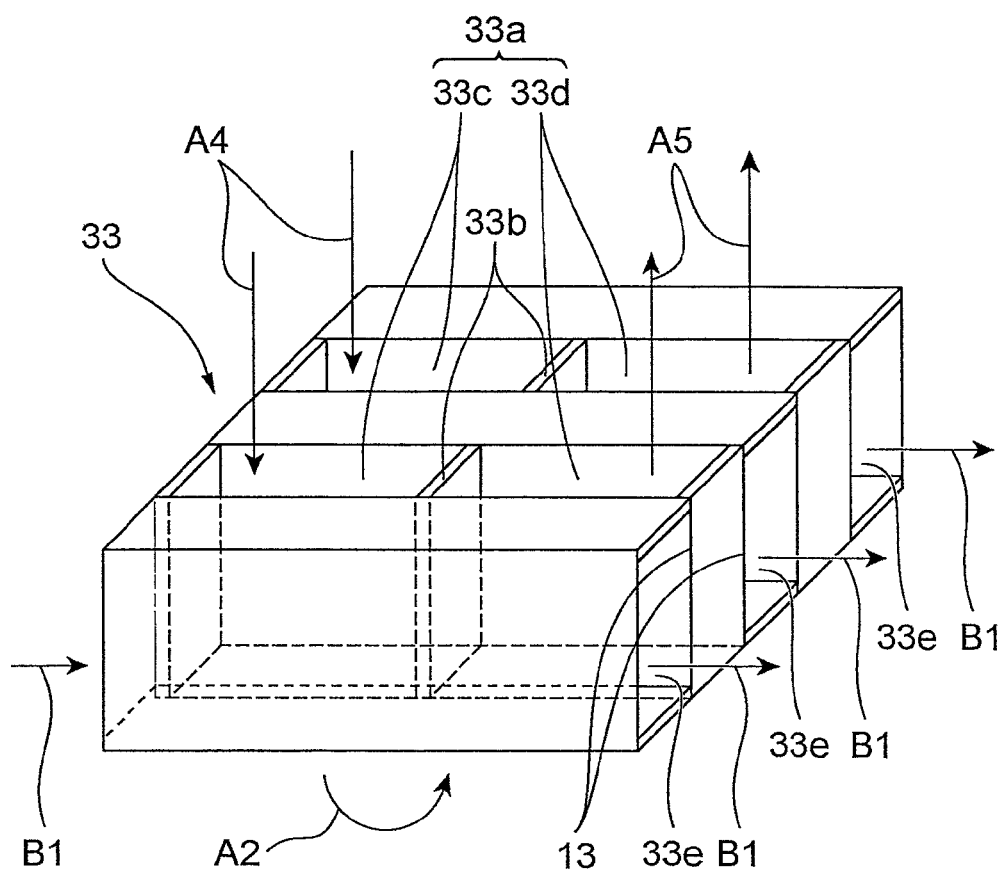
FIG. 6 is a drawing showing the third embodiment of an air-conditioning system for vehicles according to the present invention.

As shown in FIG. 6, the permeable membrane module 33 is formed in a rectangular parallelepiped shape as a whole. An outside-air circulation space 33a through which the outside air flows as shown by arrows A4 and A5 is formed in the permeable membrane module 33. More specifically, the outside-air circulation space 33a is divided into two spaces, i.e., a first space 33c and a second space 33d by a partition plate 33b.

In the first space 33c, the outside air flows through the first space 33c from the outside-air inlet 32a side to the side opposite to the outside-air inlet 32a (from the upper side to the lower side of FIG. 6) as shown by the arrow A4. The outside air that flows out of the first space 33c makes a U-turn as shown by the arrow A2. Subsequently, the outside air flows through the second space 33d from the side opposite to the outside-air outlet 32b to the outside-air outlet 32b side (from the lower side to the upper side of FIG. 6) as shown by the arrow A5.

Further, an inside-air circulation space 33e through which the inside air flows in a direction intersecting perpendicular to the outside-air circulation space 33a as shown by an arrow B1 (in the horizontal direction of FIG. 6) is formed in the permeable membrane module 33. The inside-air circulation space 33e is formed so as to be adjacent to the outside-air circulation space 33a. In the example of FIG. 6, a plurality of the outside-air circulation space 33a and a plurality of the inside-air circulation space 33e are alternately formed in the permeable membrane module 33.

The permeable membrane module 33 includes a partition between the outside-air circulation space 33a and the inside-air circulation space 33e formed of the permeable membrane 13, and the remaining part made of a material such as a resin.

In the air-conditioning case 31, a first inside-air inlet 34 that introduces the inside air into the inside-air circulation space 33e of the permeable membrane module 33 and an inside-air passage 35 through which the inside air that flows out of the inside-air circulation space 33e makes a U-turn as shown by an arrow B2 and flows are formed on a lateral side of the permeable membrane module 33.

In the air-conditioning case 31, a second inside-air inlet 36 that introduces the inside air into an blower 25 for air-conditioning as shown by an arrow B3 is formed in a portion downstream of the inside-air passage 35.

In the air-conditioning case 31, an inside-air and outside-air switching door 37 that switches between an inside-air circulation mode and an outside-air introduction mode is disposed. In the example of FIG. 5, a rotary door is used as the inside-air and outside-air switching door 37.

In the inside-air circulation mode, the inside-air and outside-air switching door 37 is rotated to a position shown by a solid line in FIG. 5 and operated to close the outside-air passage 32 and open the inside-air passage 35. Thereby, the inside air from the first and second inside-air inlets 34 and 36 is introduced into the blower 25 for air-conditioning.

In the inside-air circulation mode, the outside air that flows into the outside-air passage 32 through the outside-air inlet 32a as shown by the arrow A1 passes through the first space 33c of the outside-air circulation space 33a of the permeable membrane module 33 as shown by the arrow A4. Subsequently, the outside air makes a U-turn on the external surface side of the inside-air and outside-air switching door 37 as shown by the arrow A2, and further passes through the second space 33d of the outside-air circulation space 33a in the permeable membrane module 33 as shown by the arrow A5. Then, the outside air flows to the outside-air outlet 32b, and flows to the outside of the outside-air passage 32 as shown by the arrow A3.

Moreover, in the outside-air introduction mode, the inside-air and outside-air switching door 37 is rotated to a position shown by a double-dotted line in FIG. 5 and operated to open the outside-air passage 32 and close the inside-air passage 35. Thereby, the outside air that flows into the outside-air passage 32 through the outside-air inlet 32a passes through the first space 33c of the outside-air circulation space 33a in the permeable membrane module 33 as shown by the arrow A4. Subsequently, without making a U-turn, the outside air flows toward the blower 25 for air-conditioning, and is introduced into the blower 25 for air-conditioning.

The inside-air and outside-air switching door 37 is driven by a servo motor controlled by the control unit for air-conditioning, or a manual operation mechanism operated by the passenger, although illustration thereof is omitted.

In the example of FIG. 5, a filter 38 that removes dust, odors, and the like in the air is disposed immediately upstream of the blower 25 for air-conditioning in the air-conditioning case 31.

A heat exchanger 39 that performs at least one of cooling and heating of the blowing air sent from the blower 25 for air-conditioning is disposed downstream of the blower 25 for air-conditioning in the air-conditioning case 31. In the example, a heat exchanger for cooling that cools a blowing air and a heat exchanger for heating that heats the blowing air are disposed in the air-conditioning case 31 as the heat exchanger 39.

In the example, an air mixing door is disposed in the air-conditioning case 31 to adjust a temperature of a blow-off air to cabin 11 by adjusting a ratio of an amount of a warm air that passes through the heat exchanger for heating and that of a cold air that bypasses the heat exchanger for heating and flows, although illustration thereof is omitted.

Moreover, blow-off openings for blowing off air-conditioning air to a predetermined region within the cabin 11 are formed in a portion most downstream of the air-conditioning case 31, and a blow-off mode door is disposed in the air-conditioning case 31 to open and close these blow-off openings, although illustration thereof is omitted.

According to the present embodiment, in the inside-air circulation mode, the outside air can be supplied to one surface of the permeable membrane 13 because the outside air circulates the outside-air circulation space 33a of the permeable membrane module 33, and the inside air can be supplied to the other surface of the permeable membrane 13 because the inside air circulates the inside-air circulation space 33e. For this reason, the concentration of oxygen and the concentration of carbon dioxide in the cabin 11 can be kept at a comfortable concentration in the same manner as in the case of each above-mentioned embodiment.

Miniaturization of the air-conditioner 30 for vehicles and cost reduction can be attained because the inside-air blower 25 serves also as the blower for air-conditioning of the air-conditioner 30 for vehicles.

Further miniaturization of the air-conditioner 30 for vehicles and further cost reduction can be attained compared with the case where the passage that supplies the outside air to the permeable membrane 13 and the outside-air introduction passage that introduces the outside air into the blower 25 for air-conditioning are separately provided, because the outside-air passage 32 plays a role of supplying the outside air to the permeable membrane 13 in the inside-air circulation mode and plays a role of the outside-air introduction passage that introduces the outside air into the blower 25 for air-conditioning in the outside-air introduction mode.

Additionally, the odors that invade into the cabin 11 through the permeable membrane 13 can be effectively removed because the filter 38 is disposed in the air-conditioning case 31.

A Fourth Embodiment

Figure 7:
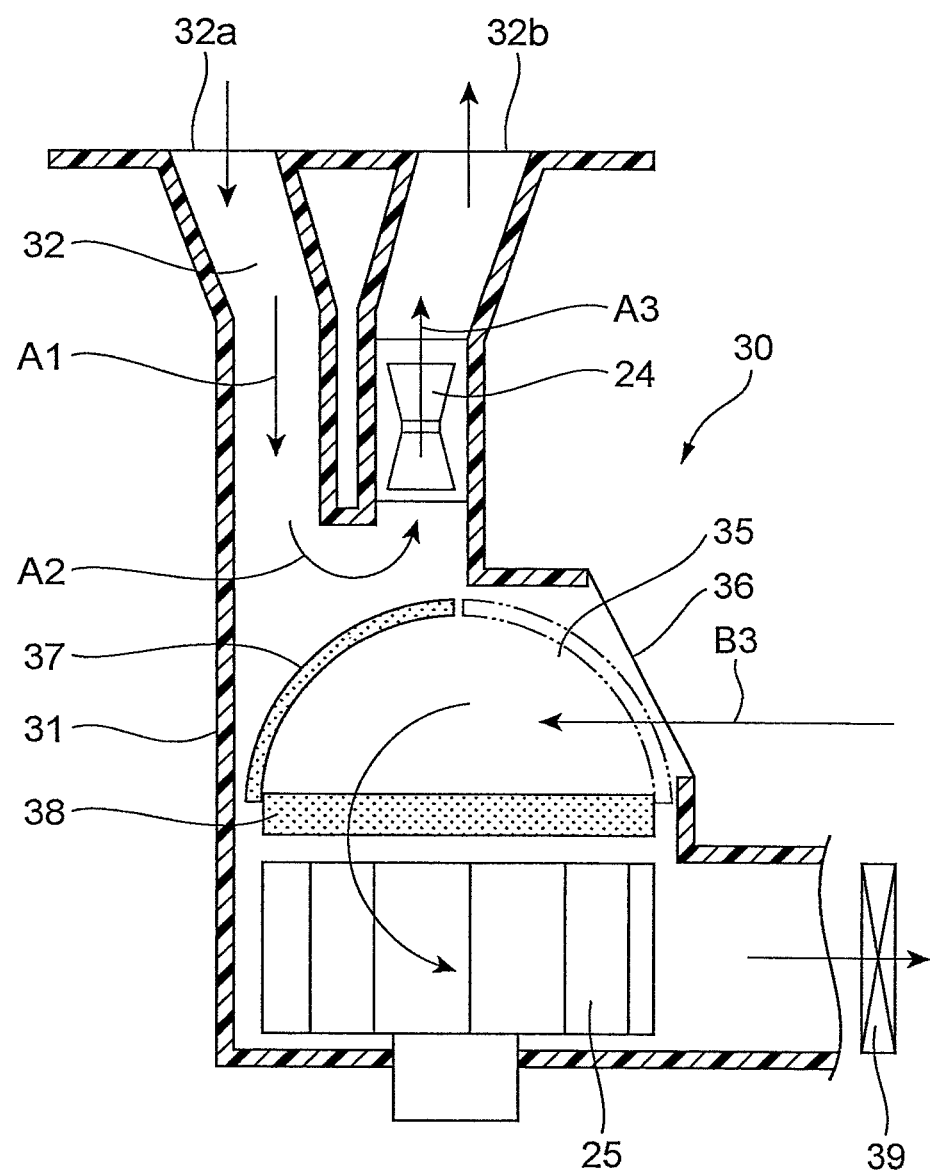
FIG. 7 is a drawing showing a fourth embodiment of an air-conditioning system for vehicles according to the present invention.

The permeable membrane is incorporated into the permeable membrane module 33 in the third embodiment above. On the other hand, in a fourth embodiment, the permeable membrane is integrated with the inside-air and outside-air switching door 37 as shown in FIG. 7. Specifically, a circular face of the inside-air and outside-air switching door (rotary door) 37 is formed of the permeable membrane 13. Accompanying this, the first inside-air inlet 34 is eliminated in the present embodiment.

With such a configuration, in the inside-air circulation mode, the outside air introduced from the outside-air inlet 32a is supplied to one surface of the permeable membrane 13 (an external surface of the inside-air and outside-air switching door 37), and the inside air introduced from the second inside-air inlet 36 is supplied to the other surface of the permeable membrane 13 (an internal surface of the inside-air and outside-air switching door 37).

In the present embodiment, miniaturization of the air-conditioner 30 for vehicles and cost reduction can be attained because the permeable membrane is integrated with the inside-air and outside-air switching door 37.

A Fifth Embodiment

A fifth embodiment is a modification of the fourth embodiment above in which the outside-air blower 24 is stopped in the outside-air introduction mode, or a direction of rotation of the outside-air blower 24 is reversed from that in the inside-air circulation mode.

Figure 8:
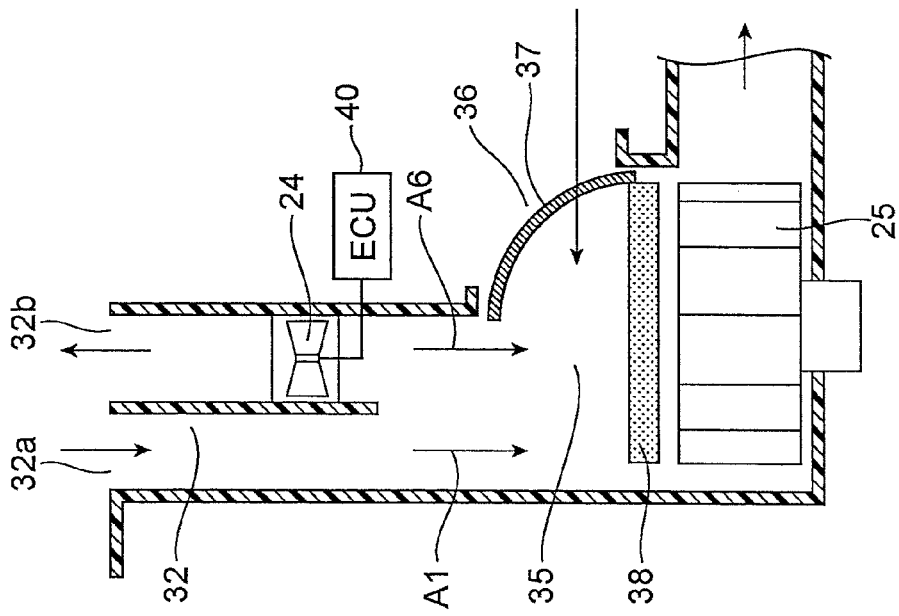
FIG. 8 is a drawing showing a fifth embodiment of an air-conditioning system for vehicles according to the present invention.
Figure 8:
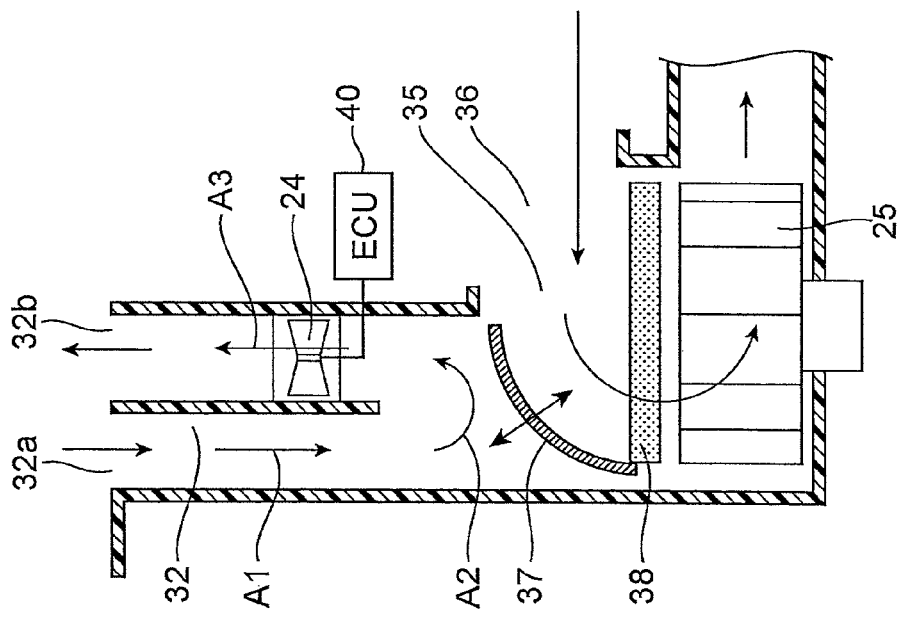

Namely, in the inside-air circulation mode shown in FIG. 8A, a control unit (ECU) 40 for air-conditioning rotates the outside-air blower 24 forward to flow the outside air out of the outside-air outlet 32b as shown by an arrow A3. In the outside-air introduction mode shown in FIG. 8B, the control unit 40 for air-conditioning stops or rotates the outside-air blower 24 in the reverse direction to flow the outside air from the outside-air outlet 32b as shown by an arrow A6.

Thereby, the outside air can be introduced from both the outside-air inlet 32a and the outside-air outlet 32b in the outside-air introduction mode. For this reason, the permeable membrane 13 can be provided in the air-conditioner 30 for vehicles without making the outside-air introduction passage of the air-conditioner 30 for vehicles larger than the conventional outside-air introduction passage.

A Sixth Embodiment

A sixth embodiment is a modification of the first embodiment above in which means for stopping a blower that stops at least one of the outside-air blower 24 or the blower 25 for air-conditioning is provided in order to suppress invasion of the odors to the cabin 11 through the permeable membrane 13 in the case where a concentration of the odors in the outside air is high. Here, the case where the concentration of the odors in the outside air is high refers to a case of traveling in a tunnel, for example.

The means for stopping a blower controls turning on and off of at least one of the outside-air blower 24 and the blower 25 for air-conditioning according to the concentration of the odors in the outside air. In this example, an odor concentration sensor (not shown) provided in a grill of the vehicle or the outside-air passage 20 detects the concentration of the odors in the outside air, and the above-mentioned control unit for air-conditioning (not shown) controls turning on and off of at least one of the outside-air blower 24 and the blower 25 for the air-conditioning.

Figure 9:
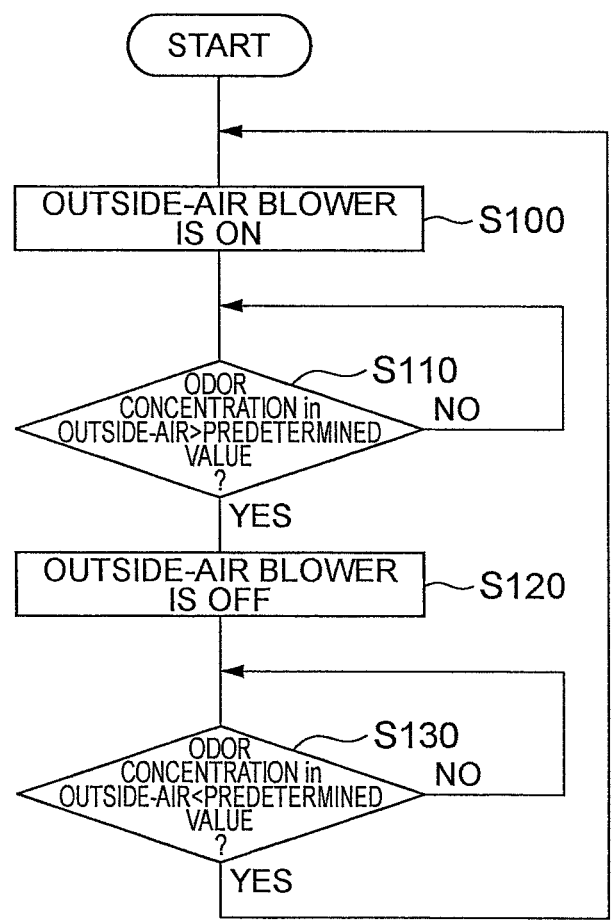
FIG. 9 is a drawing showing a sixth embodiment of an air-conditioning system for vehicles according to the present invention.

FIG. 9 is a flow chart that shows an outline of the on-off control of the outside-air blower 24 by the control unit for air-conditioning. First, at Step S100, the control unit for air-conditioning turns on the outside-air blower 24. Next, at Step S110, the control unit for air-conditioning determines whether the concentration of the odors in the outside air detected by the odor concentration sensor is larger than a predetermined value.

At Step S110, in the case where the control unit for air-conditioning determines that the concentration of the odors in the outside air is larger than the predetermined value, the control unit for air-conditioning turns off the outside-air blower 24 at Step S120. Then, at Step S130, the control unit for air-conditioning determines whether the concentration of the odors in the outside air is smaller than the predetermined value. In the case where the control unit for air-conditioning determines that the concentration of the odors in the outside air is smaller than the predetermined value, it returns to Step S100.

In the case where at Step S130, the control unit for air-conditioning determines that the concentration of the odors in the outside air is not less than the predetermined value, Step S130 is repeated. In the case where at Step S110, the control unit for air-conditioning determines that the concentration of the odors in the outside air is not more than the predetermined value, Step S110 is repeated.

The on-off control of the blower 25 for air-conditioning by the control unit for air-conditioning is performed in the same manner as in the case of FIG. 9, and therefore, description of the on-off control of the blower 25 for air-conditioning will be omitted.

According to the present embodiment, supply of at least one of the outside air and the inside air to the permeable membrane 13 can be suppressed in the case where the concentration of the odors in the outside air is high. For this reason, an amount of the gas that permeates through the permeable membrane 13 can be suppressed so that invasion of the odors to the cabin 11 can be suppressed.

Accordingly, miniaturization of the air-conditioner for vehicles and cost reduction can be attained compared with the case where means to block the permeable membrane 13 is provided to suppress invasion of the odors to the cabin 11 at a high concentration of the odors in the outside air.

The means for stopping a blower can also be configured with manual stopping means such as a blower halt switch operated by the passenger, for example.

A Seventh Embodiment

In a seventh embodiment, door switching means that detects or estimates an amount of fogging of the window, and switches the inside-air and outside-air switching door 37 to a position of the outside-air introduction mode is provided in the third to fifth embodiments above, thereby to prevent fogging of the window.

The door switching means switches the inside-air and outside-air switching door 37 to a position of the outside-air introduction mode in the case where the amount of fogging of the window is larger than a predetermined value. In the example, the above-mentioned control unit for air-conditioning (not shown) switches the inside-air and outside-air switching door 37. Estimation of the amount of fogging of the window can be performed as follows: the control unit for air-conditioning calculates the amount of fogging of the window on the basis of a temperature and humidity of the inside air detected by an inside-air temperature sensor and an inside-air humidity sensor, for example.

Figure 10:
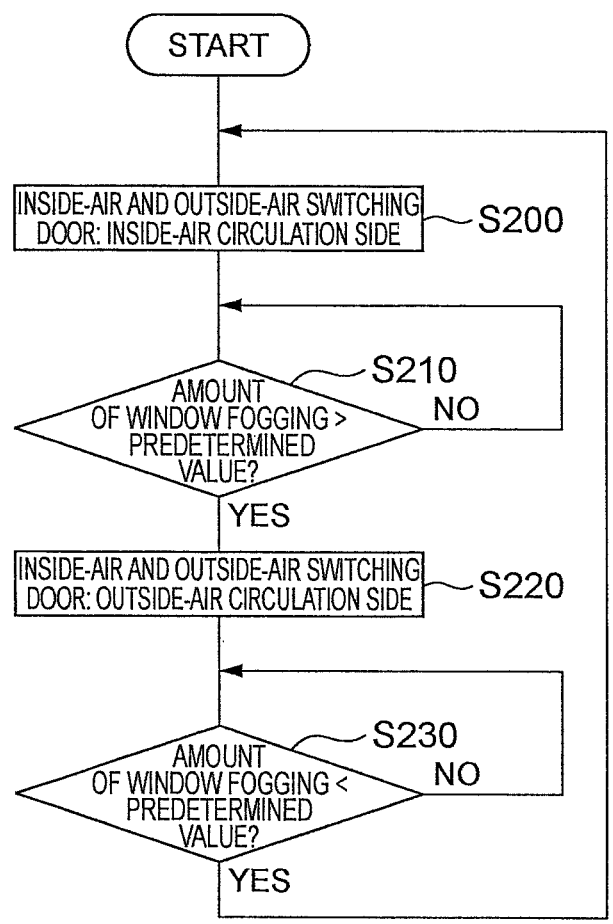
FIG. 10 is a drawing showing a seventh embodiment of an air-conditioning system for vehicles according to the present invention.

FIG. 10 is a flow chart that shows an outline of switching control of the inside-air and outside-air switching door 37 by the control unit for air-conditioning. First, at Step S200, the control unit for air-conditioning moves the inside-air and outside-air switching door 37 to the position of the inside-air circulation mode (on the inside-air circulation side). Next, at Step S210, the control unit for air-conditioning determines whether the amount of fogging of the window is larger than the predetermined value.

In the case where at Step S210, the control unit for air-conditioning determines that the amount of fogging of the window is larger than the predetermined value, the control unit for air-conditioning switches the inside-air and outside-air switching door 37 to the position of the outside-air introduction mode (on the outside-air introduction side) at Step S220. Then, at Step S230, the control unit for air-conditioning determines whether the amount of fogging of the window is smaller than the predetermined value. In the case where the control unit for air-conditioning determines that the amount of fogging of the window is smaller than the predetermined value, it returns to Step S200.

In the case where at Step S230, the control unit for air-conditioning determines that the amount of fogging of the window is not less than the predetermined value, Step S230 is repeated. In the case where at Step S210, the control unit for air-conditioning determines that the amount of fogging of the window being not more than the predetermined value, Step S210 is repeated.

According to the present embodiment, when the concentration of water vapors within the cabin 11 increases to cause fogging of the window, the outside air can be introduced to reduce the concentration of the water vapors within the cabin 11, therefore preventing fogging of the window.

Other Embodiments

Each of the above-mentioned embodiments shows an example of a specific arrangement position of the permeable membrane. The present invention will not be limited to these, and the permeable membrane can be disposed in a trunk room, or on a side wall of the vehicle, for example.

In the third embodiment above, only the outside-air passage 32 is provided as the outside-air introduction passage that introduces the outside air into the blower 25 for air-conditioning, and the permeable membrane module 33 is disposed to this outside-air passage 32. Alternatively, as the outside-air introduction passage, a passage different from the outside-air passage 32 may be provided parallel to the outside-air passage 32, and the permeable membrane module 33 may not be disposed in this different passage.

Needless to say, the configurations of the above-mentioned embodiments may be used properly in combination.

(Permeable Membrane Structure)

Figure 11:
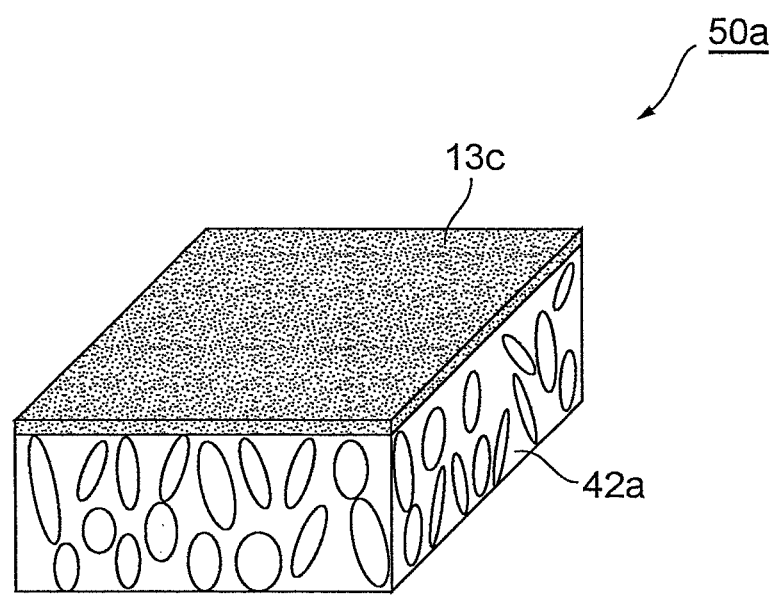
FIG. 11 is a drawing showing one embodiment of a permeable member.
Figure 12:
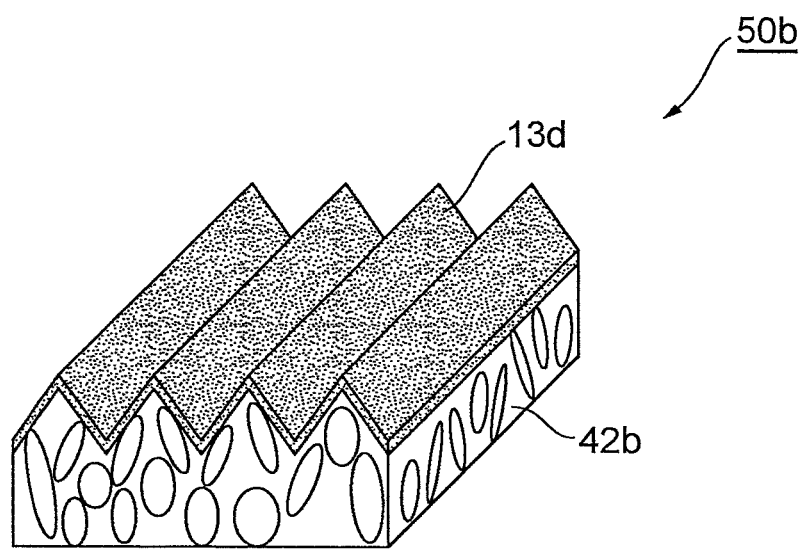
FIG. 12 is a drawing showing one embodiment of a permeable member.

In the air-conditioning system for houses and the air-conditioning system for vehicles above, a permeable membrane structure 50a shown in FIG. 11 or a permeable membrane structure 50b shown in FIG. 12 may be used instead of the permeable membrane 13.

The permeable membrane structure 50a in FIG. 11 includes a permeable membrane 13c and a support 42a. The permeable membrane 13c has a flat shape, and is supported by the support 42a having a flat shape and attached to one side of the permeable membrane 13c. The support 42a may be attached to a part of the permeable membrane 13c, e.g., a peripheral part of the permeable membrane 13c, or may be attached completely to the permeable membrane 13c.

The permeable membrane structure 50b in FIG. 12 includes a permeable membrane 13d and a support 42b. The permeable membrane 13d is pleated, and is supported by the pleated support 42b attached to one side of the permeable membrane 13d. The support 42b may be attached to a part of the permeable membrane 13d, or may be attached completely to the permeable membrane 13d.

The permeable membranes 13c and 13d are formed with a membrane made of the polymeric material mentioned above, and preferably have a thickness of 0.1 to 10 µm. The supports 42a and 42b may be made of a material that can permeate gas. Examples thereof include a paper-like fiber member, a porous body having pores of 0.1 to 500 µm, and a mesh. The support preferably has a thickness of 50 to 500 µm. The supports 42a and 42b is also preferably made of a heat insulating material. This facilitates to improve thermal efficiency in the air-conditioning system 100 for houses.

With these permeable membrane structures 50a and 50b, the permeable membranes 13c and 13d are supported by the support. This makes the permeable membranes 13c and 13d thinner to increase the amount of the gas that permeates through the permeable membranes 13c, and secures strength of the permeable membrane structure. With the permeable membrane structure 50b, the permeable membranes 13c and 13d have an increased surface area, allowing further increase in the amount of the gas that permeates.

The permeable membrane structure can be produced by forming a permeable membrane on a film removable at a post step with the above-mentioned method for forming a film, transferring a support onto the formed permeable membrane, and subsequently, removing the film, for example. Examples of the film removable at the post step include films removed by washing with water, a solvent, and a chemical, and films removed after modified by irradiation with UV, EB, and the like. Examples of methods for transferring the support onto the permeable membrane include a method for interposing a bonding agent or an adhesive between a permeable membrane and a support to attach the permeable membrane to the support, and a method for attaching a permeable membrane to a support by heating, dissolution by a solvent, and the like.

EXAMPLES

Hereinafter, the present invention will be more specifically described giving Examples. However, the present invention will not be limited to the following Examples.

Polymer Production

Polymer Production Example 1

Synthesis of Tris(trimethylsiloxy)silyl Norbornene Ring-Opening Polymer (Polymer A)

In a glass container purged with nitrogen, 20 g (0.51 mmol) of Monomer A represented by Formula (12) and 180 g of toluene were mixed, and a temperature was raised to 40° C. A solution obtained by dissolving 12 mg (0.015 mmol) of bis (tri-cyclohexylphosphine)benzylideneruthenium (IV) dichloride in 4 g of toluene was added to this, and a polymerization reaction was performed at 40° C. After the polymerization reaction started, the viscosity of the solution gradually increased. The polymerization was stopped by adding 1 g of ethyl vinyl ether after 20 minutes. The polymerization solution was put into a large amount of methanol to aggregate a precipitate. After crushing washing, the precipitate was filtered off, and dried under reduced pressure at 70° C. for 5 hours. Thus, 19.0 g of Polymer A was obtained. The molecular weight thereof was Mn=550,000 as a polystyrene conversion value by gel permeation chromatography using toluene as a solvent.

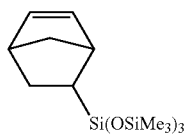

(12)

Polymer Production Example 2

Synthesis of Tris(trimethylsiloxy)silyl Norbornene-b-norbornene Addition Copolymer (Polymer B)

In a glass container purged with nitrogen, 34.7 g (0.089 mol) of Monomer A, 8.3 g (0.089 mol) of Monomer B (norbornene), and 37 mg (40 μmol) of trityltetra(pentafluorophenyl)borate {[Ph$_3$C][B(C$_6$F$_5$)$_4$]} were dissolved in 140 ml of toluene. A catalyst solution prepared separately (the one prepared by dissolving 9 mg (40 μmol) of cyclopentadienyl (allyl)palladium [C$_5$H$_5$PdC$_3$H$_5$] and 12 mg (40 μmol) of tricyclohexylphosphine [PCy$_3$] in 15 ml of toluene) was added there, and a polymerization reaction was performed at room temperature (25° C.) for 5 hours.

After completion of the reaction, the product was put into a large amount of methanol to deposit a polymer. After filtration and washing, the polymer was dried under reduced pressure at 60° C. for 5 hours. Then, 30.5 g of Polymer B was obtained.

The molecular weight of the obtained polymer by GPC measurement was Mn=726,000 and the molecular weight distribution thereof was Mw/Mn=1.51. With the $^1$H-NMR spectrum, it was confirmed that the composition ratio of the structure derived from the Monomer A and that derived from the norbornene during polymerization was A/B=46/54 (mol/mol).

Polymer Production Example 3

Synthesis of Tris(trimethylsiloxy)silyl Norbornene-b-norbornene Addition Copolymer (Polymer C)

An experiment was conducted in the same manner as in Polymer Production Example 2 except that the prepared amount of Monomer A and that of Monomer B were Monomer A; 44.7 g (0.115 mol) and Monomer B; 5.8 g (0.062 mol), respectively. Then, 34.1 g of Polymer C was obtained. It was confirmed that the molecular weight thereof was Mn=601,000, the molecular weight distribution thereof was Mw/Mn=1.49, and the composition ratio of the structure of Monomer A origin and that derived from the norbornene during polymerization was A/B=67/33 (mol/mol).

Polymer Production Example 4

Synthesis of Bis(trimethylsiloxy)methylsilyl Norbornene-b-norbornene Addition Copolymer (Polymer D)

An experiment was conducted in the same manner as in Polymer Production Example 2 except that Monomer C represented by Formula (13) was used instead of using Monomer A, and 28.0 g (0.089 mol) of Monomer C was used. Then, 29.4 g of Polymer D was obtained. It was confirmed that the molecular weight thereof was Mn=892,000, the molecular weight distribution thereof was Mw/Mn=1.62, and the composition ratio of the structure derived from the Monomer C and that derived from the norbornene during polymerization was C/B=46/54 (mol/mol).

(13)

Polymer Production Example 5

Synthesis of Bis(trimethylsiloxy)methylsilyl Norbornene-b-norbornene Addition Copolymer (Polymer E)

An experiment was conducted in the same manner as in Polymer Production Example 4 except that a prepared amount of Monomer C and that of Monomer B were Monomer C; 36.2 g (0.115 mol) and Monomer B; 5.8 g (0.062 mol), respectively. Then, 29.4 g of Polymer E was obtained. It was confirmed that the molecular weight thereof was Mn=724,000, the molecular weight distribution thereof was Mw/Mn=1.38, and the composition ratio of the structure derived from the Monomer C and that derived from the norbornene during polymerization was C/B=68/32 (mol/mol).

Polymer Production Example 6

Synthesis of Bis(trimethylsiloxy)methylsilylnorbornene Addition Polymer (Polymer F)

An experiment was conducted in the same manner as in Polymer Production Example 4 except that 55.7 g (0.177 mol) of Monomer C was used alone instead of using Monomer C and Monomer B. Then, 30.6 g of polymer F was obtained. The molecular weight thereof was Mn=632,000 and the molecular weight distribution thereof was Mw/Mn=1.39.

Polymer Production Example 7

Synthesis of trimethylsiloxymethylphenylsilyl Norbornene-b-norbornene Addition Copolymer (Polymer G)

An experiment was conducted in the same manner as in Polymer Production Example 2 except that Monomer D represented by Formula (14) was used instead of using Monomer A, and Monomer D was 27.0 g (0.089 mol). Then, 18.5 g of Polymer G was obtained. It was confirmed that the molecular weight thereof was Mn=736,000, the molecular weight distribution thereof was Mw/Mn=1.24, and the composition ratio of the structure derived from the Monomer D and that derived from the norbornene during polymerization was D/B=49/51 (mol/mol).

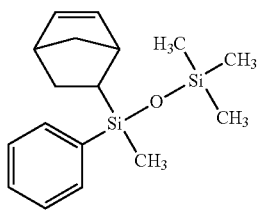

(14)

Polymer Production Example 8

Synthesis of Bis(trimethylsiloxy)methylsilyl Norbornene-b-norbornene Addition Copolymer (Polymer H)

An experiment was conducted in the same manner as in Polymer Production Example 7 except that a prepared amount of Monomer D and that of Monomer B were Monomer D; 34.8 g (0.115 mol) and Monomer B; 5.8 g (0.062 mol), respectively. Then, 20.7 g of Polymer H was obtained. It was confirmed that the molecular weight thereof was Mn=479,000, the molecular weight distribution thereof was Mw/Mn=1.32, and the composition ratio of the structure derived from the Monomer D and that derived from the norbornene during polymerization was D/B=66/34 (mol/mol).

Polymer Production Example 9

Synthesis of Bis(trimethylsiloxy)methylsilyl Norbornene Addition Polymer (Polymer I)

An experiment was conducted in the same manner as in Polymer Production Example 7 except that 53.6 g (0.177 mol) of Monomer D was used alone instead of using Monomer D and Monomer B. Then, 25.7 g of Polymer I was obtained. The molecular weight thereof was Mn=467,000, and the molecular weight distribution was Mw/Mn=1.35.

(Production of a Mesh Whose Surface Adhesion is Improved)

An adhesion improver X-92-470 (made by Shin-Etsu Chemical Co., Ltd., 10% of a solid content, a toluene-ethyl acetate solvent) was uniformly applied to a surface of a mesh (the material: PET, an opening ratio: 46%, an opening diameter: 85μ), and was air-dried at room temperature. Subsequently, heating at 120° C. for 5 minutes was performed to obtain a mesh whose surface adhesion was improved.

Production of Asymmetric Membrane

Example 1

Polymer A was dissolved in a mixed solution of tetrahydrofuran (THF) and methanol to prepare a solution for production of an asymmetric membrane. A composition of the solution was tetrahydrofuran/methanol/Polymer A:85/10/5 mass %.

A frame having a thickness of 180 μm was placed on a glass plate, and a mesh (the material: PET, opening ratio: 45%, an opening diameter: 85 μm) was laid within the frame. The above-mentioned solution was casted there by a thickness of the mesh. Subsequently, the solution was dried for 2 seconds at 25° C. to form a dense layer on a surface layer part thereof. Next, the whole glass plate was immersed in methanol, which is a solidifying solvent. Then, a porous layer was formed on the glass plate side. Namely, an asymmetric membrane (thickness: 20 μm) having the porous layer and the dense layer was formed.

Example 2

An asymmetric membrane was produced in the same way as in Example 1 except that 100 parts by mass of "NanoTek $SiO_2$" (registered trademark, made by C.I. Kasei Co., Ltd., no fine pore, a particle size (median): 25 nm, a surface property: hydrophilic), which is silica particles, was added to the solution for production of an asymmetric membrane based on 100 parts by mass of Polymer A.

Example 3

An asymmetric membrane was produced in the same way as in Example 1 except that Polymer B was used instead of Polymer A.

Example 4

An asymmetric membrane was produced in the same way as in Example 1 except that Polymer C was used instead of Polymer A.

Example 5

An asymmetric membrane was produced in the same way as in Example 1 except that Polymer D was used instead of Polymer A.

Example 6

An asymmetric membrane was produced in the same way as in Example 1 except that Polymer E was used instead of Polymer A.

Example 7

An asymmetric membrane was produced in the same way as in Example 1 except that Polymer F was used instead of Polymer A.

Example 8

An asymmetric membrane was produced in the same way as in Example 1 except that Polymer G was used instead of Polymer A.

Example 9

An asymmetric membrane was produced in the same way as in Example 1 except that Polymer H was used instead of Polymer A.

Example 10

An asymmetric membrane was produced in the same way as in Example 1 except that Polymer I was used instead of Polymer A.

Example 11

An asymmetric membrane was produced in the same way as in Example 2 except that Polymer B was used instead of Polymer A.

Example 12

An asymmetric membrane was produced in the same way as in Example 2 except that Polymer E was used instead of Polymer A.

Example 13

An asymmetric membrane was produced in the same way as in Example 2 except that Polymer F was used instead of Polymer A.

Example 14

An asymmetric membrane was produced in the same way as in Example 12 except that the mesh whose surface adhesion was improved was used as the mesh.

Example 15

An asymmetric membrane was produced in the same way as in Example 13 except that the mesh whose surface adhesion was improved was used as the mesh.

Example 16

An asymmetric membrane was produced in the same way as in Example 2 except that the mesh whose surface adhesion was improved was used as the mesh.

Production of Water Surface Spread Membrane

Comparative Example 1

Polymer A was dissolved in toluene to prepare a solution for water surface spread membrane production. The concentration of Polymer A was 5 mass % on the basis of the entire mass of the solution. Using this solution, the membrane was formed with a water surface spreading method on a support Isopore (made by Nihon Millipore K. K., the material: polycarbonate, an average pore size of 0.22 µm). Subsequently, toluene and moisture were removed with a dryer to obtain a membrane having an average thickness of 0.1 µm.

Comparative Example 2

Polymer C was dissolved in toluene to prepare a solution for production of a water surface spread membrane. The concentration of Polymer C was 5 mass % on the basis of the entire mass of the solution. Using this solution, the membrane was formed with a water surface spreading method on a support Isopore (made by Nihon Millipore K. K., the material: polycarbonate, an average pore size of 0.22 µm). Subsequently, toluene and moisture were removed with a dryer to obtain a membrane having an average thickness of 0.1 µm.

Comparative Example 3

Polymer E was dissolved in toluene to prepare a solution for production of a water surface spread membrane. The concentration of Polymer E was 5 mass % on the basis of the entire mass of the solution. Using this solution, the membrane was formed with a water surface spreading method on a support Isopore (made by Nihon Millipore K. K., the material: polycarbonate, an average pore size of 0.22 µm). Subsequently, toluene and moisture were removed with a dryer to obtain a membrane having an average thickness of 0.1 µm.

Comparative Example 4

Polymer H was dissolved in toluene to prepare a solution for production of a water surface spread membrane. The concentration of Polymer H was 5 mass % on the basis of the entire mass of the solution. Using this solution, the membrane was formed with a water surface spreading method on a support Isopore (made by Nihon Millipore K. K., the material: polycarbonate, an average pore size of 0.22 µm). Subsequently, toluene and moisture were removed with a dryer to obtain a membrane having an average thickness of 0.1 µm.

Comparative Example 5

Polymer F was dissolved in toluene to prepare a solution for production of a water surface spread membrane. The concentration of Polymer F was 5 mass % on the basis of the entire mass of the solution. Using this solution, the membrane was formed with a water surface spreading method on a support Isopore (made by Nihon Millipore K. K., the material: polycarbonate, an average pore size of 0.22 µm). Subsequently, toluene and moisture were removed with a dryer to obtain a membrane having an average thickness of 0.1 µm.

<Evaluation of a Membrane>
(1) Check for Presence of Pores

Figure 13:
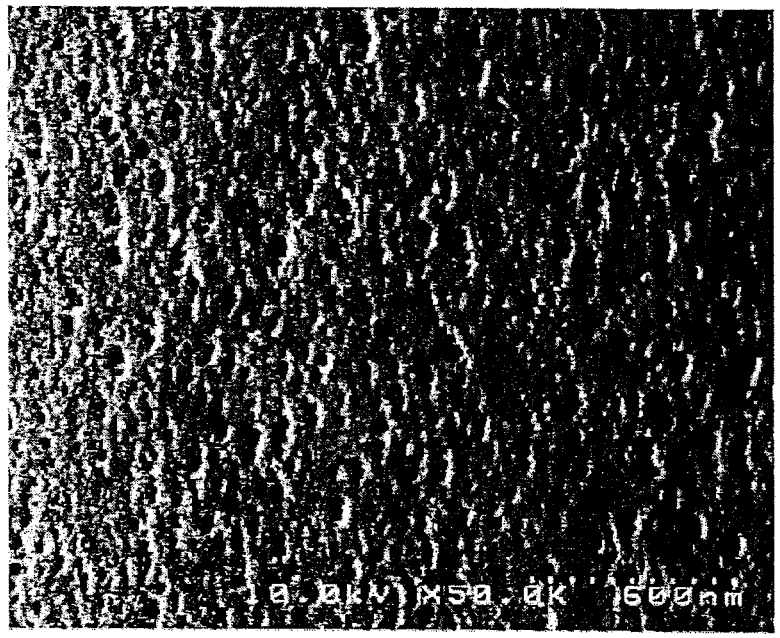
FIG. 13 shows an SEM image of an asymmetric membrane according to Example 6.
Figure 14:
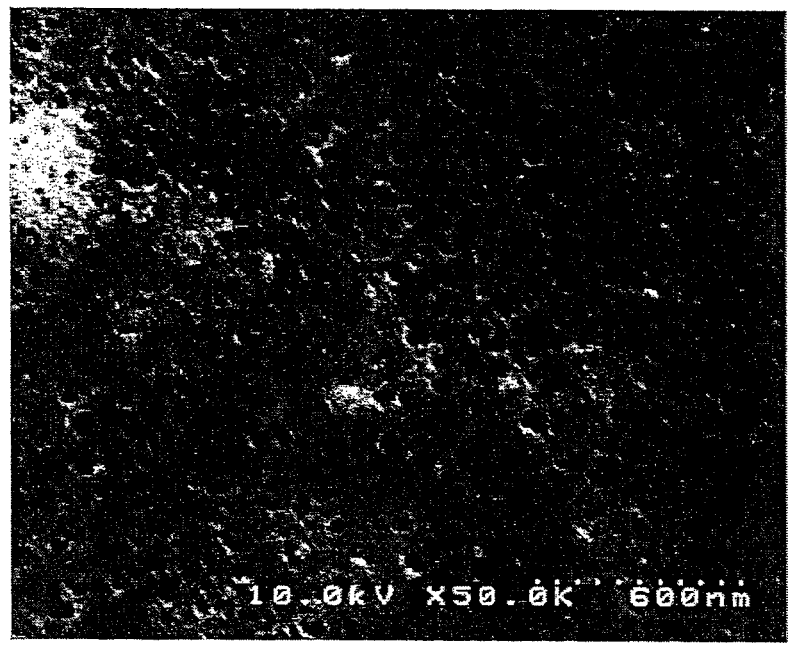
FIG. 14 shows an SEM image of an asymmetric membrane according to Example 12.
Figure 15:
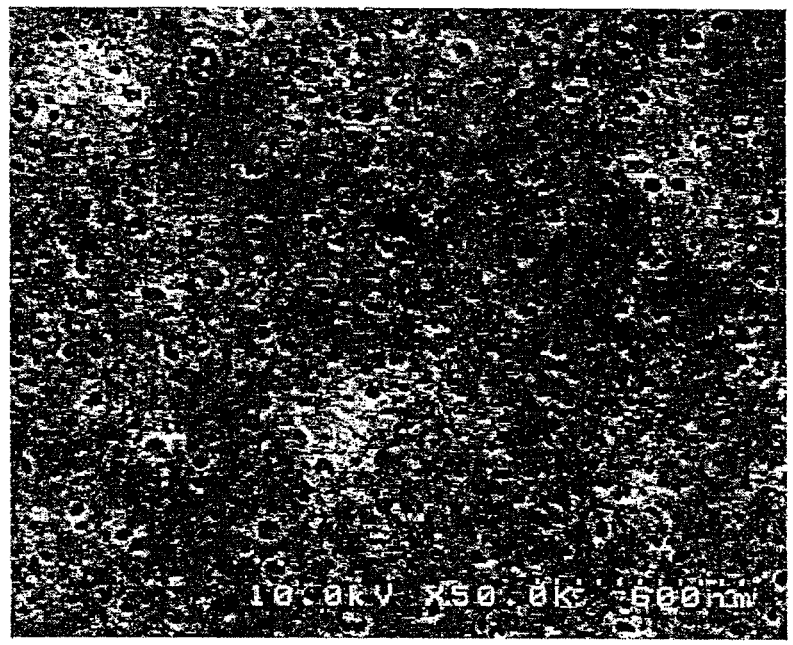
FIG. 15 shows an SEM image of an asymmetric membrane according to Example 14.
Figure 16:
FIG. 16 shows an SEM image of a water surface spread membrane according to Comparative Example 3.

For the asymmetric membranes obtained in Examples and the water surface spread membranes obtained in Comparative Examples, the surface thereof (on the dense layer side in the asymmetric membranes) was observed with a scanning electron microscope (SEM), and presence of pores was checked. The results are shown in Table 1. FIG. 13 shows an SEM image of the asymmetric membrane according to Example 6, FIG. 14 shows an SEM image of the asymmetric membrane according to Example 12, FIG. 15 shows an SEM image of the asymmetric membrane according to Example 14, and FIG. 16 shows an SEM image of the water surface spread membrane according to Comparative Example 3.

(2) Gas Permeability Coefficient
(A Uniform Pressure Method)

Figure 17:
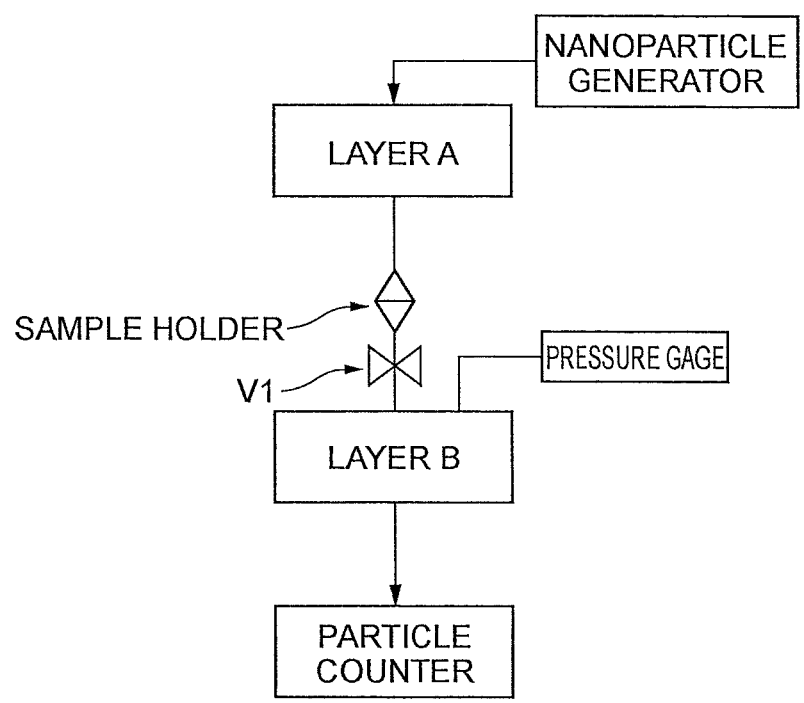
FIG. 17 is a schematic view of a gas permeability evaluation apparatus for measuring a gas permeability coefficient.

Using an apparatus for measuring gas permeability at uniform pressure (made by Denso Corporation, see a gas permeability evaluation apparatus in FIG. 17), the asymmetric membranes obtained in Examples and the water surface spread membranes obtained in Comparative Examples were measured for gas permeability coefficients with respect to oxygen and carbon dioxide ($P(O_2)$ and $P(CO_2)$) on the following measurement conditions. The obtained gas permeability coefficients ($P(O_2)$ and $P(CO_2)$) were divided by the thickness (L) of the membrane to calculate gas permeation rates ($P(O_2)/L$ and $P(CO_2)/L$), respectively. The separation ratio $\alpha$ ($=P(O_2)/(P(CO_2))$) was also calculated. The result is shown in Table 1.

With respect to an initial environment in the evaluation apparatus, the initial concentration environment was created by supplying the gas to an evaluation chamber from a cylinder in which the concentrations of oxygen and carbon dioxide were adjusted in advance (for example, oxygen concentration: 20.5%, carbon dioxide concentration: 4000 ppm). Outside the evaluation chamber is atmospheric air (oxygen concentration: 20.8 to 20.9%, carbon dioxide concentration: 400 to 600 ppm). A partition plate (not shown) was provided in a membrane installation part so as to block the membrane from outside air by the partition plate before the evaluation began. The evaluation of the membrane was initiated under the measurement conditions below by removing the partition plate in the membrane installation part, and an exchange of the gases between the outside and inside of the evaluation chamber was performed. Namely, the gas permeation rates with respect to oxygen and carbon dioxide were measured based on changes in the concentrations of the two gaseous components inside the evaluation chamber. In the initial concentration environment, the direction of the flows of the gases to be measured with respect to the membrane were such that oxygen flowed from outside to inside, and carbon dioxide flowed from inside to outside. The oxygen and carbon dioxide concentrations inside and outside the evaluation chamber were measured by an oxygen sensor (made by Chino Corporation, model: MG1200) and a carbon dioxide sensor (made by Vaisala Corporate, model: GMP343), respectively, and the measured results were recorded on a data logger (made by Chino Corporation, model: KIDS ver6).

(Measurement Conditions)

Temperature: 23±2° C.

Pressure difference across the membrane: zero

Figure 18:
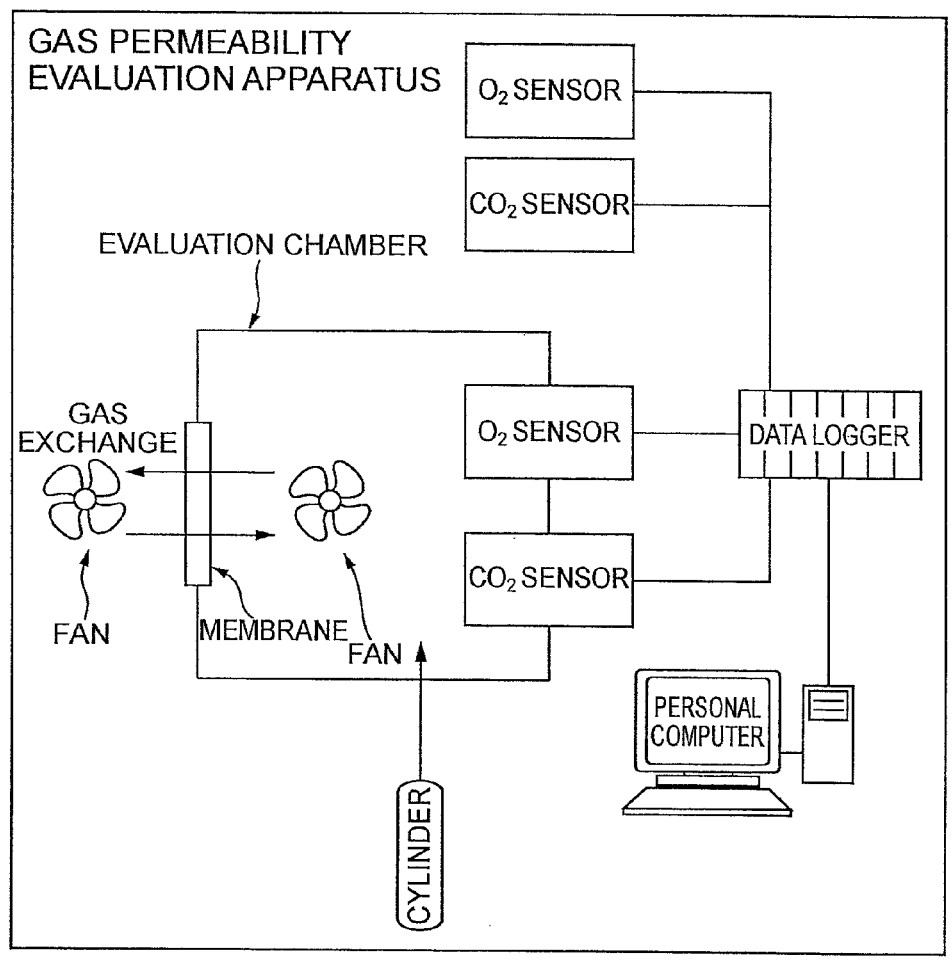
FIG. 18 is a schematic view of a measuring apparatus for measuring an SPM-blocking ratio.

Partial pressure differences in the gases across the membrane: oxygen: 0.0013 to 0.0066 atm, carbon dioxide: 0.0001 to 0.0011 atm (3) SPM-Blocking Ratio According to the procedure given below, the SPM-blocking ratio was measured using a measurement apparatus (see FIG. 18) in which a layer A connected with a nanoparticle generator (made by Palas, model: GFG-1000) and a layer B connected with a particle counter (made by TSI Incorporated, model: SMPS-3034) were coupled via a holder in which a membrane sample was placed. The result is shown in Table 1.

i) Carbon particles with particle sizes of 10 to 500 nm were generated by the nanoparticle generator and stored in the layer A.

ii) A sample of an asymmetric membrane (a water surface spread membrane) was placed on the sample holder (membrane area: a maximum of 16 cm²), and a valve V1 between the sample holder and layer B was closed to reduce the pressure in the layer B until the differential pressure between the layer A and the layer B reached 1 kPa.

iii) The valve V1 was opened, and the carbon particles were carried by gases that permeated when the pressure in the layer B returned to atmospheric pressure to be supplied to the membrane, and the carbon particles that permeated through the membrane were stored in the layer B.

iv) The concentration of the carbon particles in the layer B was measured using the particle counter.

v) The SPM-blocking ratio was calculated based on the following expression:

$$SPM\text{-blocking ratio}[\text{mass \%}]=100\times\{(C\text{in}-C\text{out})/C\text{in}\},$$

(wherein Cin is the particle concentration [μg/mL] in the layer A, and Cout is the particle concentration [μg/mL] in the layer B.)

(4) Strength of the Membrane

Figure 19:
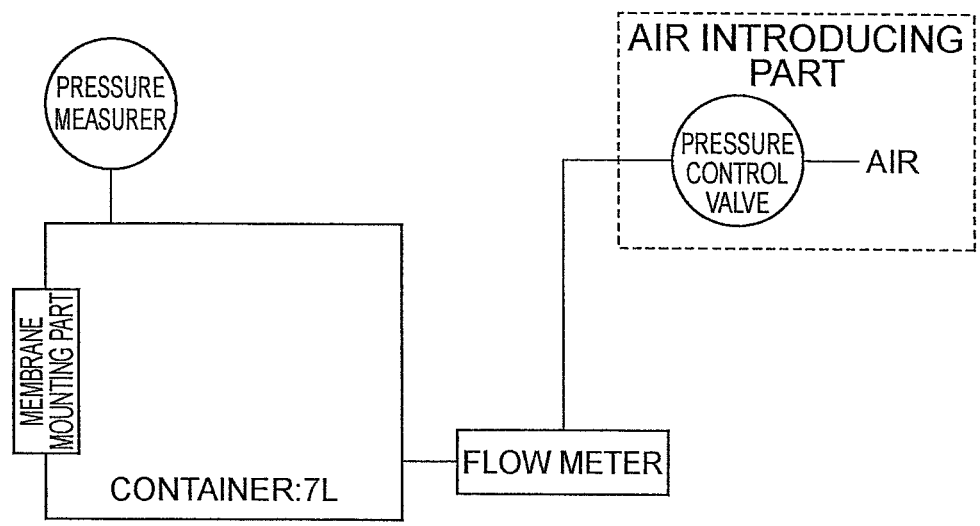
FIG. 19 is a schematic view of an apparatus for measuring strength of a membrane.

Strength of the membrane was measured using an apparatus shown in FIG. 19. This apparatus includes a container made of aluminum of 7 L having a membrane mounting part on which a membrane is mounted (made by Denso Corporation); an air introducing part that introduces air into the container; a pressure measuring part (pressure measurer) that measures pressure in the container; and an introduced air measuring part (flow meter) that measures an amount of the air introduced into the container.

The air introducing part may be any one that can supply boosted air, e.g., a compressor and air inside a hall. The pressure measuring part is a part that makes evaluation by introducing air into the container in which a pressure gage (made by Nidec Copal Electronics Corp., model: PG-30-101R or PG-30-102R) is installed (for example, from 1 to 50 kPa). The air measurement part measured an amount of a gas flow (for example, from 1 to 200 sccm) at some arbitrary pressure (in the range of 1 to 50 kPa) with a mass flow meter (made by Kojima Instruments, Inc., model 3100). With respect to the pressure gage and the mass flow meter, preferably, a combination of the pressure gage and the mass flow meter is changed according to resistance and strength of the membrane (particularly in the case where evaluation at a pressure of not more than 1 kPa is necessary).

An evaluation method is described below. A procedure for measuring a container internal pressure at a fixed flow rate is described in the example, although a converse method may be used.

First, after a membrane was mounted on the membrane mounting part of the container, the air was introduced into the container and an arbitrary flow rate thereof (from 1 to 200 sccm) was kept. When the container internal pressure was stabilized, an amount of a flow discharged from the membrane under the pressure was considered to be the air flow rate in the introduced air measuring part, and was used as the air flow rate at the pressure. Measurement was performed by gradually increasing the air flow rate from the lowest air flow rate (for example, increasing the air flow rate every 1% based on the full scale). A phenomenon that the container internal pressure reduces is observed at some air flow rate. As an index of strength of the membrane, pressure data immediately before reduction in pressure was observed was used. The data is shown in Table 1.

TABLE 1

| | | Conditions of experiment | | | | Presence of pore | Gas permeation rate | | Separation rate $P(O_2)/P(CO_2)$ | nSPM-blocking ratio wt % | Evaluation of strength kPa |
|---|---|---|---|---|---|---|---|---|---|---|---|
| | Membrane type | Support | Polymer | Presence of silica | Improvement of adhesion | | $P(O_2)/L$ | $P(CO_2)/L$ | | | |
| Example 1 | Asymmetric membrane | Mesh | A | No | No | Yes | 2.43E-02 | 1.93E-02 | 1.26 | >99.9 | — |
| Example 2 | Asymmetric membrane | Mesh | A | Yes | No | Yes | 3.30E-02 | 2.71E-02 | 1.22 | 99.80 | 12.3 |
| Example 3 | Asymmetric membrane | Mesh | B | No | No | Yes | 3.16E-02 | 2.46E-02 | 1.28 | >99.9 | — |
| Example 4 | Asymmetric membrane | Mesh | C | No | No | Yes | 3.40E-02 | 2.69E-02 | 1.26 | 99.85 | — |
| Example 5 | Asymmetric membrane | Mesh | D | No | No | Yes | 3.53E-02 | 2.62E-02 | 1.35 | 99.70 | — |
| Example 6 | Asymmetric membrane | Mesh | E | No | No | Yes | 3.26E-02 | 2.74E-02 | 1.19 | >99.9 | 40.1 |
| Example 7 | Asymmetric membrane | Mesh | F | No | No | Yes | 3.00E-02 | 2.30E-02 | 1.30 | 99.86 | 11.8 |
| Example 8 | Asymmetric membrane | Mesh | G | No | No | Yes | 1.07E-02 | 1.00E-02 | 1.07 | >99.9 | — |
| Example 9 | Asymmetric membrane | Mesh | H | No | No | Yes | 3.15E-02 | 2.22E-02 | 1.42 | >99.9 | — |

TABLE 1-continued

| | Conditions of experiment | | | | Presence of pore | Gas permeation rate | | Separation rate P(O₂)/P(CO₂) | nSPM-blocking ratio wt % | Evaluation of strength kPa |
|---|---|---|---|---|---|---|---|---|---|---|
| Membrane type | | Support | Polymer | Presence of silica | Improvement of adhesion | | $P(O_2)/L$ | $P(CO_2)/L$ | | | |
| Example 10 | Asymmetric membrane | Mesh | I | No | No | Yes | 2.97E−02 | 2.01E−02 | 1.48 | >99.9 | — |
| Example 11 | Asymmetric membrane | Mesh | B | Yes | No | Yes | 3.66E−02 | 2.77E−02 | 1.32 | 99.87 | — |
| Example 12 | Asymmetric membrane | Mesh | E | Yes | No | Yes | 3.77E−02 | 2.80E−02 | 1.35 | 99.80 | 37.2 |
| Example 13 | Asymmetric membrane | Mesh | F | Yes | No | Yes | 3.69E−02 | 2.84E−02 | 1.30 | 99.73 | 11.3 |
| Example 14 | Asymmetric membrane | Mesh | E | Yes | Yes | Yes | 3.73E−02 | 2.77E−02 | 1.35 | 99.81 | 43.2 |
| Example 15 | Asymmetric membrane | Mesh | F | Yes | Yes | Yes | 3.75E−02 | 2.78E−02 | 1.35 | 99.75 | 12.1 |
| Example 16 | Asymmetric membrane | Mesh | A | Yes | Yes | Yes | 3.72E−02 | 3.10E−02 | 1.22 | — | 17.4 |
| Comparative Example 1 | Water surface spread membrane | Isopore | A | No | No | No | 2.99E−04 | 8.08E−04 | 0.37 | >99.9 | — |
| Comparative Example 2 | Water surface spread membrane | Isopore | C | No | No | No | 3.43E−04 | 5.39E−04 | 0.64 | >99.9 | — |
| Comparative Example 3 | Water surface spread membrane | Isopore | E | No | No | No | 8.80E−04 | 1.50E−03 | 0.58 | >99.9 | — |
| Comparative Example 4 | Water surface spread membrane | Isopore | H | No | No | No | 4.05E−04 | 7.20E−04 | 0.56 | >99.9 | — |
| Comparative Example 5 | Water surface spread membrane | Isopore | F | No | No | No | 3.45E−04 | 8.24E−04 | 0.42 | >99.9 | — |

What is claimed is:

1. An air-conditioning system that supplies a gas to a space to be air-conditioned and/or discharges a gas from the space to be air-conditioned through a permeable membrane;

wherein the permeable membrane is an asymmetric membrane made of a polymeric material prepared by polymerizing a monomer composition containing a monomer represented by Formula (1):

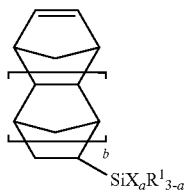

(1)

wherein each $R^1$ is independently a $C_{1-12}$ alkyl group and/or a $C_{6-10}$ aryl group, X is a group represented by Formula (i) and/or a group represented by Formula (ii):

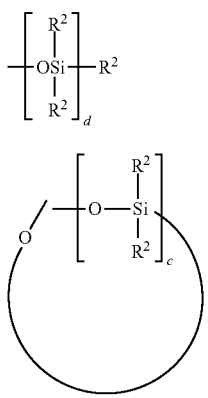

wherein each $R^2$ is independently a $C_{1-12}$ alkyl group, d is an integer of 1 to 5, and c is an integer of 3 to 5; a is an integer of 1 to 3, and b is an integer of 0 to 2; and wherein the polymeric material is an addition polymer prepared by addition polymerization of a monomer composition containing the monomer represented by Formula (1).

2. The air-conditioning system according to claim 1, wherein the polymeric material is a polymeric material in which a silica filler is dispersed.

3. The air-conditioning system according to claim 1, wherein a ratio between an oxygen permeability coefficient $P(O_2)$ and a carbon dioxide permeability coefficient $P(CO_2)$ of the asymmetric membrane at 23±2° C. and under no pressure difference across the membrane satisfies Expression (3):

$$1.0 < P(O_2)/P(CO_2) < 1.70 \qquad (3).$$

4. The air-conditioning system according to claim 1, wherein the air-conditioning system is an air-conditioning system for vehicles.

5. The air-conditioning system according to claim 1, wherein the air-conditioning system is an air-conditioning system for houses.

6. An air-conditioning system for vehicles that supplies a gas to a space to be air-conditioned and/or discharges a gas from the space to be air-conditioned through a permeable membrane;

wherein the permeable membrane is an asymmetric membrane made of a polymeric material prepared by polymerizing a monomer composition containing a monomer represented by Formula (1):

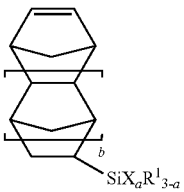

(1)

wherein each $R^1$ is independently a $C_{1-12}$ alkyl group and/or a $C_{6-10}$ aryl group, X is a group represented by Formula (i) and/or a group represented by Formula (ii):

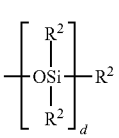

(i)

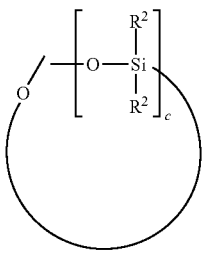

(ii)

wherein each $R^2$ is independently a $C_{1-12}$ alkyl group, d is an integer of 1 to 5, and c is an integer of 3 to 5; a is an integer of 1 to 3, and b is an integer of 0 to 2, wherein a ratio between an oxygen permeability coefficient $P(O_2)$ and a carbon dioxide permeability coefficient $P(CO_2)$ of the asymmetric membrane at 23±2° C. and under no pressure difference across the membrane satisfies Expression (3):

$$1.0 < P(O_2)/P(CO_2) < 1.70 \qquad (3), \text{ and}$$

wherein the polymeric material is an addition polymer prepared by addition polymerization of a monomer composition containing the monomer represented by Formula (1).

7. An air-conditioning system for houses that supplies a gas to a space to be air-conditioned and/or discharges a gas from the space to be air-conditioned through a permeable membrane;

wherein the permeable membrane is an asymmetric membrane made of a polymeric material prepared by polymerizing a monomer composition containing a monomer represented by Formula (1):

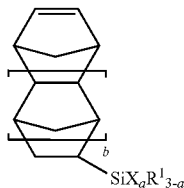

(1)

wherein each $R^1$ is independently a $C_{1-12}$ alkyl group and/or a $C_{6-10}$ aryl group, X is a group represented by Formula (i) and/or a group represented by Formula (ii):

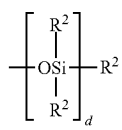

(i)

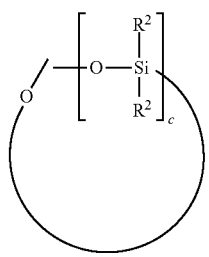

(ii)

wherein each $R^2$ is independently a $C_{1-12}$ alkyl group, d is an integer of 1 to 5, and c is an integer of 3 to 5; a is an integer of 1 to 3, and b is an integer of 0 to 2, wherein a ratio between an oxygen permeability coefficient $P(O_2)$ and a carbon dioxide permeability coefficient $P(CO_2)$ of the asymmetric membrane at 23±2° C. and under no pressure difference across the membrane satisfies Expression (3):

$$1.0 < P(O_2)/P(CO_2) < 1.70 \qquad (3), \text{ and}$$

wherein the polymeric material is an addition polymer prepared by addition polymerization of a monomer composition containing the monomer represented by Formula (1).

* * * * *